(12) United States Patent
Takahashi et al.

(10) Patent No.: US 6,841,259 B1
(45) Date of Patent: Jan. 11, 2005

(54) MAGNETIC THIN FILM, PRODUCTION METHOD THEREFOR, EVALUATION METHOD THEREFOR AND MAGNETIC HEAD USING IT, MAGNETIC RECORDING DEVICE AND MAGNETIC DEVICE

(75) Inventors: Migaku Takahashi, 20-2, Hirokita 2-chome, Taihaku-ku, Sendai-shi, Miyagi-ken (JP); David Djayaprawira, Miyagi-ken (JP); Hiroki Shoji, Miyagi-ken (JP)

(73) Assignee: Migaku Takahashi, Miyagi-ken (JP)

( * ) Notice: Subject to any disclaimer, the term of this patent is extended or adjusted under 35 U.S.C. 154(b) by 132 days.

(21) Appl. No.: 09/720,736

(22) PCT Filed: Nov. 20, 2000

(86) PCT No.: PCT/JP00/08167

§ 371 (c)(1),
(2), (4) Date: Dec. 29, 2000

(87) PCT Pub. No.: WO01/93286

PCT Pub. Date: Dec. 6, 2001

(30) Foreign Application Priority Data

May 31, 2000 (JP) .................................... 2000-163822
Oct. 20, 2000 (JP) .................................... 2000-321757

(51) Int. Cl.[7] ......................... B32B 15/04; H01R 10/10; H01R 10/14
(52) U.S. Cl. ............. 428/457; 428/694 T; 428/694 TS; 428/692
(58) Field of Search ............................... 428/615, 655, 428/668, 670, 457, 692, 694 T, 694 TS

(56) References Cited

U.S. PATENT DOCUMENTS

| | | | | |
|---|---|---|---|---|
| 4,858,049 A | * | 8/1989 | Kobayashi et al. ......... 360/126 |
| 4,953,051 A | * | 8/1990 | Wada et al. ................. 360/126 |
| 5,006,395 A | * | 4/1991 | Hori et al. ................... 428/141 |
| 5,068,147 A | * | 11/1991 | Hori et al. ................... 428/336 |
| 5,854,727 A | * | 12/1998 | Tanaka et al. ............... 360/125 |
| 6,255,006 B1 | * | 7/2001 | Ohnami et al. ......... 428/694 TS |

FOREIGN PATENT DOCUMENTS

| | | | |
|---|---|---|---|
| JP | 09347562 | * | 7/1999 |
| JP | 11-186033 | * | 7/1999 |
| WO | WO93/12928 | * | 7/1993 |

OTHER PUBLICATIONS

Wiley Encyclopedia of Electrical and Electronics Engineering Online, "Keeper Layered Magnetic Media" copyright 1999, posted Dec., 27, 1999 Http://www.mrw.interscience.wiley.com/eeee/05/4505/W.45–5–3.*

* cited by examiner

*Primary Examiner*—D. S. Nakarani
*Assistant Examiner*—Nikolas J. Uhlir
(74) *Attorney, Agent, or Firm*—Young & Thompson

(57) ABSTRACT

A magnetic thin film with a saturation magnetic flux density of 2 T or more and a coercive force of 2 Oe or less for a magnetic pole material of a recording head. The magnetic thin film consists of an iron carbide film that includes a martensite ($\alpha'$) phase as the principal phase and at least carbon and iron as constituent elements. The iron carbide film preferably consists of a single $\alpha'$ phase. The iron carbide film has a body-centered tetragonal structure and a c-axis constitutes an axis of hard magnetization and, a c-plane constitutes a plane of easy magnetization. The axis of hard magnetization constitutes a direction which is generally perpendicular to the film surface, and the plane of easy magnetization constitutes a direction which is generally parallel to the film surface.

38 Claims, 20 Drawing Sheets

MAGNETIC THIN FILM, PRODUCTION METHOD THEREFOR, EVALUATION METHOD THEREFOR AND MAGNETIC HEAD USING IT, MAGNETIC RECORDING DEVICE AND MAGNETIC DEVICE

TECHNICAL FIELD

The present invention relates to a magnetic thin film, a method of producing and a method of evaluating the same, and a magnetic ea magnetic recording device, magnetic device using the same. More particularly, the present invention relates to a magnetic thin film having both high saturation magnetic flux density and small coercive force, which is suited for increasing the recording density and frequency, a method of producing and a method of evaluating the same, and a magnetic head, a magnetic recording device, and a magnetic device using the same.

The magnetic thin film of the present invention is suited for use as magnetic pole materials of magnetic heads for recording magnetic signals on hard disks, floppy disks, and magnetic tapes.

BACKGROUND ART

With recent advances in computerization, the need for equipment for storing information, especially small-size and large capacity recording devices, has continued to increase. To respond to these needs, technology for improving the recording density per unit area of magnetic recording media have intensively been developed by various research facilities.

To increase the recording density, it has been required to develop a medium having a high coercive force capable of allowing an infinitesimal magnetic domains written in the recording medium of the medium to coexist stably, a recording head capable of writing the infinitesimal magnetic domain in the medium, and a read head capable of detecting a leakage magnetic field from the infinitesimal magnetic domain.

A conventional magnetic head has been composed of an element having both functions of recording and reproduction. With the reduction of the diameter of the medium due to the size reduction of the device, the linear velocity in the direction of magnetization reversal decreases. Therefore, it has become standard to install a read head comprising a magnetoresistive (MR) element utilizing the magnetoresistive effect capable of stably detecting the leakage magnetic field with high sensitivity without depending on the linear velocity. Namely, current magnetic heads are composed of a combination of a write-only recording head and a read-only read head.

As is apparent from such a technical trends, a high magnetic pole material having a high saturation magnetic flux density, capable of generating a strong magnetic field will be essential to next generation recording heads in order to sufficiently magnetize a medium having a high coercive force, to thereby record a signal.

As the magnetic pole material which has preferably been used heretofore, for example, a permalloy (78 wt % Ni—Fe alloy) having a saturation magnetic flux density of about 1 tesla (T) is well known. Further, sendust (Fe—Al—Si alloy) having a saturation magnetic flux density of about 1.1–1.2 T and a Co-based amorphous material having a saturation magnetic flux density of about 1.5 T have been developed as materials having an improved saturation magnetic flux density.

The following materials have attracted special interest recently.

(1) Japanese Patent Application, First Application No. Hei 11-074122 (referred to as publication 1) discloses a method of producing a Co—Fe—Ni alloy film using a plating method. It describes that it is possible to produce a Co—Fe—Ni alloy having a crystal structure comprising a α' phase having a body-centered cubic structure and an τ phase having a face-centered cubic structure wherein the cobalt content is within a range from 40 to 70% by weight, the iron content is within a range from 20 to 40% by weight, and the nickel content is within a range from 10 to 20% by weight and that the resulting alloy film has a small coercive force, small magnetostriction and saturation magnetic flux density of 2 T or more. It also describes that a post heat treatment at 100° C. or higher is effective to improve the corrosion resistance.

(2) Japanese Patent Application, First Application No. Hei 08-107036 (referred to as publication 2) discloses a method of producing an alloy film consisting essentially of Fe or Co using a sputtering method. It describes, as a material of a magnetic film which exhibits soft magnetic characteristics by a heat treatment, a material consisting of an alloy comprising Fe or Co as a principal element, at least one element selected from Ta, Zr, Hf and Nb in a concentration within a range from 5 to 20 atomic % and at least one element selected from Si, B, C and N in a concentration within a range from 5 to 20 atomic %, said material further comprising at least one element other than the magnetic element, which is selected from Al, Ti, Cr, Ru, Rh, Pt, Pd, Mo and W in a concentration within a range from 1 to 20 atomic %. The resulting alloy film has a saturation magnetic flux density of 1.5 T, a coercive force of 0.1 Oe (1 Oe=about 79 Å/m), a permeability of 3000 or more and magnetostriction constants of $10^{-7}$ level, and also has good soft magnetic characteristics.

(3) SUGITA et al. about a method of producing single crystal $Fe_{16}N_2$ film using a MBE (molecular beam epitaxy) method as follows [Y. SUGITA et al., J. Appl. Phys. 76, 6637 (1994), referred to as publication 3]. As a substrate, a special substrate of $In_0 0.2 Ga_0 0.8 As$ (001) wherein the length of the a-axisnd lattice constants of a $Fe_{16}N_2$ film to be formed are nearly allowed to agree with each other is used. First, this substrate is heat-treated (675° C., five minutes) in a vacuum and then iron as a deposition source is scattered in a nitrogen atmosphere by means of an electron beam to form an iron nitride film containing about 11 atomic % of nitrogen. In that case, it is important to control a film deposition rate within a range from 0.002 to 0.003 nm/sec and to control a gas pressure within a range from 0.1 to 0.2 mTorr during the formation of a film. The resulting iron nitride film was a martensite (a) film and the saturation magnetic flux density thereof was about 2.4 T. After film formation, the film was subjected to a heat treatment at 200° C. in a vacuum on the order of $10^{-8}$ Torr, i.e. an annealing treatment for 90 hours to obtain a single crystal $Fe_{16}N_2$ (α') film having a saturation magnetic flux density of about 2.9 T.

However, the prior arts described above had the following problems.

① According to the technology disclosed in the publication 1, a magnetic pole material of a recording head is produced by a wet process such as a plating method. On the other hand, it is difficult to produce a MR element which also constitutes a read head by the plating method and the MR element must be produced by a dry process such as a sputtering method. Accordingly, the production of the magnetic pole material by means of the plating method should be avoided from the viewpoint that a cheap production process is constructed by avoiding double investment or an interfacial control relating to two processes (e.g. avoidance of contamination, retention of evenness, etc.) is stabilized.

② In the technology disclosed in the publication 1, it is necessary to form a primary plating layer on an insulating layer by a sputtering method for a plating layer made of the above material constituting a magnetic pole. This step is indispensable for the magnetic pole material of the publication 1 to satisfy the desired characteristics. However, it is merely the addition of a useless section or a useless interface in view of the head structure and, therefore, it can promote peeling of a film and striction, which are caused by the interface.

③ It can be judged to be indispensable to add a post heat treatment at 100° C. or higher or a protective film because of poor corrosion resistance of the magnetic pole material of the publication 1 after film formation. This fact suggests that a countermeasure must be considered when the magnetic pole material of the publication 1 is applied to a product.

④ Since the magnetic pole material of the publication 2 is capable of producing a recording head by the same sputtering method as that used in case of the MR element constituting the read head, the material can be highly rated for promote production of all magnetic heads by means of the dry process. However, it must be said that the resulting saturation magnetic flux density of about 1.5 T is not enough to write information in a medium having a coercive force of 2500 oersted or more, which is used to increase the recording density.

⑤ The magnetic pole material of the publication 2 must be at least a quarternary material and a quinary material is described in the embodiments. As a result, the margin of the composition ratio capable of attaining a good saturation magnetic flux density is likely to be narrow and accurate control of the composition of the film is required.

⑥ It is necessary for the magnetic pole material of the publication 2 to control the grain size in order to obtain the desired magnetic characteristics, and a heat treatment is indispensable to obtain the desired magnetic characteristics after film formation. For example, it is described that the formed film is heat-treated at 490° C., which is 50° C. lower than the crystallization temperature, for three hours and then heat-treated at 590° C. for 30 minutes. In the case that a recording head is formed after forming a read head, this heat treatment is a process which cannot be employed because it can cause turbulence at the interface of an MR element composed of a laminate of very thin layers, which constitute the read head, resulting in deterioration of the characteristics of the MR element.

⑦ The magnetic film of the publication 3 has the feature that the highest saturation magnetic flux density, 2.9 T among all the saturation magnetic reflux densities that have ever been reported, and can be formed by a MBE method a dry processes. However, it had never been applied to an actual process of producing a magnetic head because a magnetic film having the desired characteristics cannot be obtained only on the surface of a special substrate and the film deposition rate is very small, such as 0.002–0.003 nm/sec and is not suited for use in the mass-production processes.

For the reasons described above, it has been desired to develop a magnetic pole material for a recording head which simultaneously satisfies the following conditions, and a method of producing the same in the production process of a recording/reproduction separated type magnetic head.

(A) A magnetic pole material having a saturation magnetic flux density of 1.5 T or more, preferably 2 T or more.

(B) A magnetic pole material having a coercive force of 2 Oe or less, preferably 1 Oe or less.

(C) A magnetic pole material which can be produced by the same dry process as that used in the production of a MR element of a read head, and a method of production the same.

(D) A method having a film deposition rate suited for use in the mass-production processes, i.e. applicability to a production process capable of using a cheap production line.

(E) A magnetic pole material which can be formed at a low temperature of not higher than 100° C. so as not to exert an effect on an interface of a thin film laminate produced previously, e.g. MR element, and a method of producing the same.

It has been reported that these plural conditions can be satisfied, for example, in the report of KIM and TAKAHASHI Issued in 1972 [T. K. KIM and M. TAKAHASHI, Appl. Phys. Lett. 20, 492 (1972) ].

In this report, it deserves special mention that an iron nitride film having a low coercive force and a very high saturation magnetic flux density of 2.58 T was formed on a substrate maintained at about room temperature at a mass-producible film deposition rate by using a very simple thin film forming method such as a deposition method, as once dry process. Although additional tests were conducted in various research facilities, a stable magnetic film having the characteristics described above could not be obtained and was formed only under the special conditions as described in the publication 3.

Accordingly, now, a magnetic pole material for a recording head which satisfies the conditions described in (A) to (E), and a method of producing the same, are strongly required.

Although the description above dealt particularly with a magnetic head for longitudinal magnetic recording, a magnetic pole material having the above characteristics, i.e. "saturation magnetic flux density of 1.5 T or more, preferably 2 T or more" and "coercive force of 2 Oe or less, preferably 1 Oe or less can also be employed as a magnetic pole material constituting a magnetic head for perpendicular magnetic recording, as a matter of course. Accordingly, the magnetic material having the above saturation magnetic flux density can also be employed as a magnetic head for perpendicular magnetic recording. Therefore, it has been required to develop such a magnetic thin film having excellent soft a magnetic characteristics because it can be employed widely in the field of the magnetic recording for either longitudinal or perpendicular recording.

It has been desired to employ a magnetic thin film, which satisfies the conditions described in (A) to (E) and a method of producing the same, as various magnetic head devices described below, in addition to application to the magnetic pole material constituting the magnetic head.

(AL1) A magnetic thin film to be formed on a hard magnetic film which serves as a recording layer constituting a longitudinal magnetic recording medium.

(AL2) A magnetic thin film to be formed under a hard magnetic film which serves as a recording layer constituting a perpendicular magnetic recording medium.

(AL3) A magnetic thin film to be used as at least portion of a soft magnetic film constituting an exchange-spring magnet or a spin transistor magnet.

(AL4) A magnetic thin film to be used as at least portion of a transition line constituting a magnetic sensor.

(AL5) A magnetic thin film to be used as at least portion of a transition line constituting a high frequency passive device.

(AL6) A magnetic thin film to be used as at least portion of a transition line constituting a micro transformer or a micro inductor.

Also in any of magnetic devices described in (AL1) to (AL6), it is possible to expect that the magnetic pole material having the above characteristics, i.e. "saturation magnetic flux density of 1.5 T or more, preferably 2 T' or more" and "coercive force of 2 Oe or less, preferably 1 Oe or less" can further improve various characteristics of various magnetic devices.

The first object of the present invention is to provide a magnetic thin film having soft magnetic characteristics with at least a saturation magnetic flux density of 2 T or more and a coercive force of 2 Oe or less without requiring any heat treatment during and after forming a film.

The second object of the present invention is to provide a method of producing a magnetic thin film having soft magnetic characteristics suited for use as a magnetic pole material of a recording head, which can be produced by the same dry process as that in case of a MR element constituting a read head.

The third object of the present invention is to provide a method of evaluating, which comprises specifying that a film during or after forming the film is an iron carbide film comprising an α' phase as a principal phase and at least carbon and iron as a constituent element.

The fourth and fifth objects of the present invention are to provide a magnetic head capable of recording a signal by sufficiently magnetizing a medium having a high coercive force, and a magnetic recording device equipped with the same.

The sixth object of the present invention is to provide a magnetic recording medium capable of coping with an increase of the recording density.

The seventh object of the present invention is to provide various magnetic devices having various excellent characteristics as compared with the prior art, e.g. excellent characteristics in energy product, frequency, and current density.

DISCLOSURE OF THE INVENTION

The magnetic thin film of the present invention has the feature that it consists of an iron carbide film, said iron carbide film comprising an α' phase as a principal phase and at least carbon and iron as constituent elements.

The method of producing a magnetic thin film of the present invention has the feature that it comprises the step of forming an iron carbide film comprising an α' phase as a principal phase and at least carbon and iron as constituent elements on a substrate disposed in a vacuum space by using any film forming method of a sputtering method, a vacuum deposition method, a CVD method, an ion beam method, and a laser deposition method.

The first method of evaluating a magnetic thin film of the present invention has the feature that it comprises using an X-ray diffraction method as a means for specifying said magnetic thin film as an iron carbide film comprising an α' phase as a principal phase and at least carbon and iron as constituent elements.

The second method of evaluating a magnetic thin film of the present invention has the feature that it comprises using an electron diffraction method as a means for specifying said magnetic thin film as an iron carbide film comprising an a phase as a principal phase and at least carbon and iron as constituent elements.

The magnetic head of the present invention has the feature that it comprises the iron carbon film with the above as a magnetic pole material of a recording head.

The magnetic recording film of the present invention has the feature that it comprises a magnetic head capable of magnetically recording information on a moving magnetic recording medium using the magnetic head.

The first magnetic device of the present invention has the feature that it comprises a hard magnetic film which serves as a recording layer constituting a longitudinal magnetic recording medium, and a magnetic thin film consisting of the iron carbide film with the above constitution, which is formed on the hard magnetic film.

The second magnetic device of the present invention has the feature that it comprises a hard magnetic film which serves as a recording layer constituting a longitudinal magnetic recording medium, and a magnetic thin film consisting of the iron carbide film with the above constitution, which is formed under the hard magnetic film.

The third magnetic device of the present invention has the feature that it comprises the magnetic thin film consisting of an iron carbide film with the above constitution used as a soft magnetic layer constituting a spin transistor magnet.

The fourth magnetic device of the present invention has the feature that it comprises the magnetic thin film consisting of an iron carbide film with the above constitution used as at least a portion of a transmission line constituting a magnetic sensor.

The fifth magnetic device of the present invention has the feature that it comprises the magnetic thin film consisting of an iron carbide film with the above constitution used as at least a portion of a transmission line constituting a high frequency passive device.

The sixth magnetic device of the present invention has the feature that it comprises the magnetic thin film consisting of an iron carbide film of with the above constitution used as at least a portion of a magnetic film constituting a micro transformer or a micro inductor.

Description of Reference Symbols

Figure 1A:
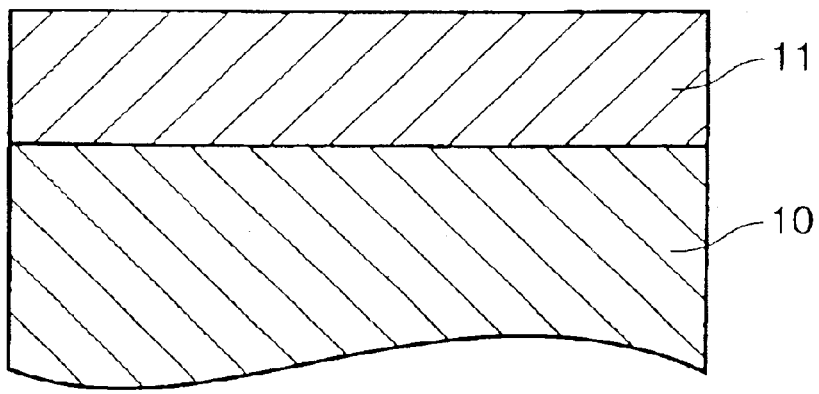
FIG. 1 is a schematic cross-sectional view showing an embodiment of a magnetic thin film according to the present invention, in which (a) shows a case where a magnetic recording layer is formed directly on a substrate and (b) shows a case where a magnetic layer is formed on a substrate via a buffer layer.

10: Substrate
11: Magnetic layer
12: Buffer layer
21: Film forming chamber
22: Cathode for forming buffer layer
23: Cathode for forming magnetic film
24: First target
25: Second target
26, 27: Insulating members
28, 29: DC powder sources
30, 31: Earth shield
32: Shutter
33: Rotating means of shutter
34: Aperture of shutter
35: Substrate holder supporting member
36: Rotating means of substrate holder supporting member
37: Temperature control means of substrate
38: Substrate holder
39: Substrate
40: Magnetic field applying means
41: Exhaust port
42: Gas inlet port
43: Pumping means
44: Gas supply source
50: Magnetic head
51: Magnetoresistive element
52: Lower shield layer
53: Lower magnetic pole which also serves as upper shield layer
54: Coil
55: Upper magnetic pole
56: Substrate
57: Base
58: Read head
59: Recording head
70: Hard disk drive
71: Chassis
72: Magnetic recording medium
73: Spacer
74: Spindle
75: Motor
76: Bearing
77: Rotating axis
78: Swing arm
79: Suspension
80: Recording head
81: Base
82: Insulating material
83: Coil
84: Intermediate layer
85: Protective layer
87: Perpendicular magnetic recording medium
88: Base
89: Recording layer
90, 91: Longitudinal magnetic recording media
92: Base
93: Metallic underlayer 94: Recording layer
95: Magnetic thin film
96: Protective layer
97: Intermediate layer
100, 101: Perpendicular magnetic recording media
102: Base
103: Magnetic thin film
104: Recording layer
105: Protective layer
106: Intermediate layer
200: Exchange-spring magnet
201: Hard magnetic layer
202: Soft magnetic layer
203: Spin transistor magnet
204: Hard magnetic layer
205: Non-magnetic layer
206: Soft magnetic layer
300: Magnetic sensor
301: Magnetic film
302, 304: Insulating layer
304, 305: Conductive line
400: High frequency passive device
401: Base
402, 404: Insulating layer
403; Magnetic layer
405: Line
500: Micro transformer (micro inductor)
501: Magnetic layer
502: Insulating material
503: Line

BEST MODE FOR CARRYING OUT THE INVENTION

In light of the above background, the present inventors have carried out intensive studies with respect to magnetic materials. Thus, the present invention has been completed.

The embodiments of the present invention will be described below with reference to the accompanying drawings.

The magnetic thin film of the present invention is an iron carbide film, which makes it possible to confirm by the X-ray diffraction method using CoK α radiation that that its crystal structure contains a single martensite (α') phase. As shown in FIG. 1(a), this iron carbide film can be stably formed on a substrate 10 which is not heat-treated at a temperature of 100° C. or higher during the formation of a film. This iron carbide film 11 has good soft magnetic characteristics with both of a saturation magnetic flux density of 2 T or more and a coercive force Hc of 2 Oe or less without being heat-treated after forming the film.

As shown in FIG. 2, the iron carbide film 11 with the features described above mainly contains a diffraction line from the (002) plane, i.e. α' (002) and is identified by observing using the X-ray diffraction method. In FIG. 2, (a) shows the case where a diffraction line from the (002) plane of the magnetic thin film forms a principal peak with a broad shoulder being observed on the side of the higher angle thereof and (b) shows the case where only a diffraction line from the (002) plane of the magnetic thin film is observed.

Figure 2A:
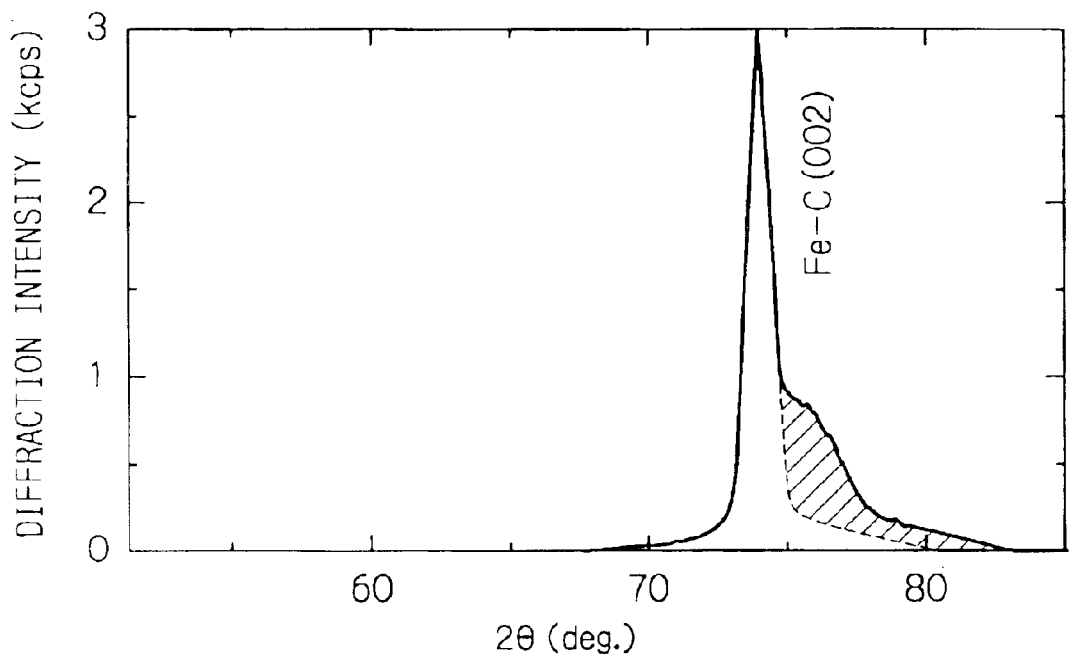
FIG. 2 is a graph showing the results of X-ray diffraction of the magnetic thin film according to the present invention, in which (a) shows a case where a diffraction line from the (002) plane of the magnetic thin film forms a principal peak with a broad shoulder being observed on the side of the higher angle thereof and (b) shows a case where only a diffraction line from the (002) plane of the magnetic thin film is observed.
Figure 2B:
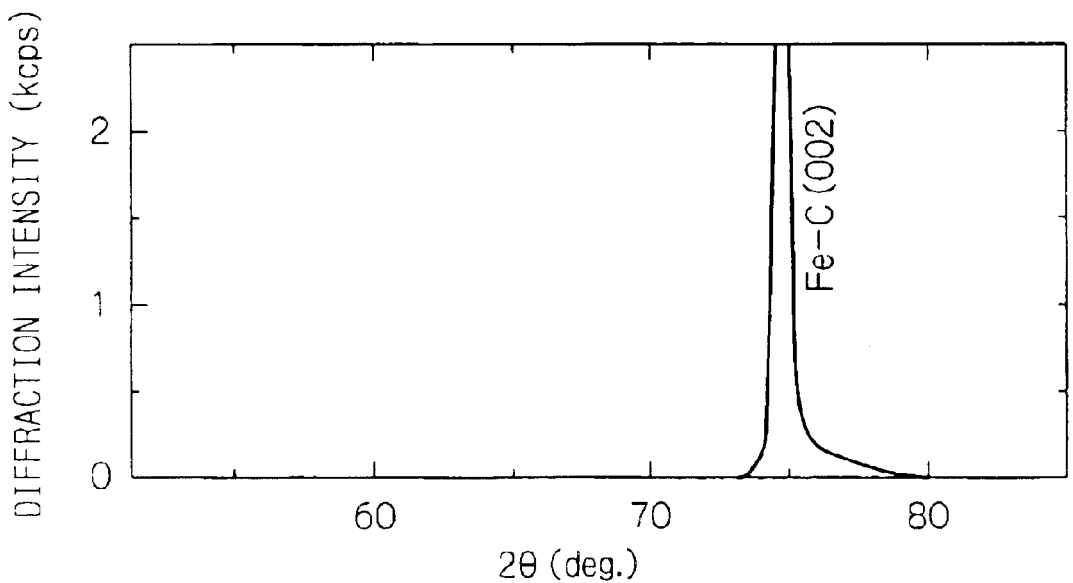

Good soft magnetic characteristics with both of a saturation magnetic flux density of 2 T or more and a coercive force Hc of 2 Oe or less can be easily obtained in the case of an iron carbide film wherein only the diffraction line from the (002) plane is observed as shown in FIG. 2(b) as compared with the case of the iron carbide film shown in FIG. 2(a). For example, it is possible to obtain a film having such characteristics that Bs exceeds 2.2 T or Hc is 1 Oe or less. With respect to the iron carbide film shown in FIG. 2(a), although the soft magnetic characteristics are lowered to some extent, the saturation magnetic flux density Bs of 2 T or more and the coercive force Hc of 2 Oe or less can be obtained even if the above broad shoulder is present.

Although only the iron carbide film consisting of carbon and iron was described in the above construction, the iron carbide film can contain other elements such as Co, Ni, C, O, N, B, Ta, Nd, Au, Ag, and Pd, in addition to the elements iron, for the purpose of improving various characteristics such as magnetorestriction, magnetic anisotropy energy, permeability, resistivity, corrosion resistance, and machinability, as a matter of course.

As is apparent from FIG. 2(a), the iron carbide 11 comprising an α' phase as a principal phase according to the present invention is composed of a diffraction line from the (002) plane of the α' phase and the other diffraction line, i.e. a broad shoulder (a slash part) observed on the side of higher angle thereof.

In case the other diffraction line disappears and a single crystal is formed, the iron carbide film 11 is composed only of a single α' phase and is specified by observing only the diffraction line from the (002) plane of the α' phase as shown in FIG. 2(b).

The diffraction line from the (002) plane of the α' phase is obtained at 2 θ within a range from 70 to 77°. When 2 θ is within a range from 20 to 115°, a diffraction line stronger than α' (002) is not observed. Accordingly, it is possible to easily identify whether the iron carbide film 11 of the present invention has the desired crystal form during the production, thus making it possible to form a film while accurately grasping the film quality after or during the formation of a film.

It can be confirmed by the Schulz reflection method that the iron carbide film of the present invention has a bct structure (body-centered tetragonal structure). Therefore, the film quality of the iron carbide film during or after film formation by employing the Schulz reflection method, thus making it possible to construct more stable production process.

As is apparent from the measurement of a magnetization curve using a vibrating sample magnetometer (VSM), it is difficult for the iron carbon film to magnetize the <001> direction and is easy to magnetize the <100> direction and the <110> direction. Therefore, it can be confirmed that the c-plane constitutes a plane of easy magnetization. This means that reversal control of the direction of the magnetization occurred in the plane by applying a positive and negative external magnetic field having a proper intensity in the c-plane of the iron carbide film. Accordingly, the iron carbide film of the present invention is suited for use as a magnetic pole material of a recording head.

Particularly, the iron carbide film has the magnetic anisotropy energy required when the spontaneous magnetization deflects toward the direction of the c-axis from the c-plane, which is about two orders of magnitude larger than the magnetic anisotropy energy required when spontaneous magnetization deviates from the direction of an axis of easy magnetization in the c-plane. Accordingly, the iron carbide film makes it possible to stably control the direction of the magnetization only in the c-plane without deflecting toward the direction of the c-axis from the c-plane.

Furthermore, since the axis of hard magnetization described above constitutes a direction which is generally perpendicular to the film surface, and said plane of easy magnetization constitutes a direction which is generally horizontal to the film surface, the direction to which the external magnetic field is applied may be a direction which is parallel to the film surface of the iron carbide film, i.e. a direction which is parallel to the surface of the substrate. Namely, even if a means of applying the external magnetic field is disposed on the same substrate on which the iron carbide film is formed, it becomes possible to control the magnetization direction along the direction which is parallel to the surface of the substrate. Therefore, the iron carbide film of the present invention is very easy to handle.

When the iron carbide film of the present invention consists of not less than 0.5 atomic % and not more than 15 atomic % of carbon and iron as the balance, it is possible to have a saturation magnetic flux density of 2 T or more and to control the coercive force to 2 Oe or less. If the film consists of not less than 1 atomic % and not more than 12 atomic % of carbon and iron as a balance, the coercive force is further reduced to 1 Oe or less, which is more preferable.

In case the iron carbide film contains a proper amount of cobalt as a third element, it is made possible to further increase the saturation magnetic flux density to obtain a numerical value that exceeds 2.2 T while maintaining the coercive force at a low value.

Although the iron carbide film of the present invention has a magnetostriction on the order of $10^{-6}$, the magnetostriction is reduced by incorporating nitrogen as the third element, thereby making it possible to realize a thin film having a very small magnetostriction on the order of 10 Furthermore, uniaxial magnetocrystalline anisotropy constants Ku on the order of $10^5$ [erg/cm$^3$] can be obtained by incorporating a proper amount of nitrogen into the iron carbide film and appropriately controlling the C content in the film.

Various magnetic characteristics described above can be obtained more stably by forming an iron carbide film on a thin film having almost the same interatomic distance as that of the iron carbide film. Examples of the thin film include an iron film having the (200) plane as the surface.

To obtain various magnetic characteristics described above more stably, the element constituting the thin film is preferably an element having almost the same lattice constants as those of the iron carbide film. When using a thin film consisting essentially of an element having almost the same lattice constants as those of the iron carbide film, the initial growth of the iron carbide film to be deposited thereon is conducted very stably and a film having higher crystallizability is attained by suppressing the occurrence of magnetostriction in the film even if the film thickness increases, thus obtaining an iron carbide film having various stable magnetic characteristics. Examples of an element having almost the same lattice constants as those of the iron carbide film include one or more elements selected from Ag, Au, Pd, Pt, Rh, Al, Ir, and Ru. The lattice constants of the respective elements are as follows: Ag=4.09 Å (a-axis), Au=4.08 Å (a-axis), Pd=3.89 Å (a-axis), Pt=3.92 Å (a-axis), Rh 3.80 Å (a-axis), Al=4.05 Å (a-axis), Ir=3.84 Å (a-axis), and Ru=4.28 Å (a-axis). As used herein, the term "almost the same lattice constants as those of the iron carbide film" refers to lattice constants within a range from 4 Å±10% (c-axis), provided that 1 Å is 0.1 nm.

Furthermore, the iron carbide film of the present invention has the feature that the magnetocrystalline anisotropy constants Ku are negative. This suggests that spontaneous magnetization becomes stable in the c-plane so that it can be easily judged whether the film has the desired film quality by examining the magnetocrystalline anisotropy constants of the resulting iron carbide film.

As described above, the iron carbide film of the present invention has the feature that the c-axis constitutes an axis of hard magnetization and the c-plane constitutes a plane of easy magnetization and the magnetic anisotropy energy required when the spontaneous magnetization deflects toward the direction of the c-axis from the c-plane is two orders of magnitude larger than the magnetic anisotropy energy required when the spontaneous magnetization deviates from the direction of an axis of easy magnetization in the c-plane. Since this feature is the same as that of a magnetoplumbite type oxide called Ferroxplana known as a high frequency core, it suggests that the magnetic thin film consisting of the iron carbide of the present invention shows promise as a material for a high frequency core.

The method of producing the magnetic thin film of the present invention has the feature that it comprises the step of forming an iron carbide film comprising an α' phase as a principal phase and at least carbon and iron as a constituent element on a substrate disposed in a vacuum space by using any film forming method of a sputtering method, a vacuum deposition method, a CVD method, an ion beam method, and a laser deposition method. The sputtering method is preferably used because a high tack of the magnetic thin film to the substrate can be easily obtained. However, the method is not limited to the sputtering method as far as the method comprises the step of forming a magnetic thin film consisting of an iron carbide film, said iron carbide film at least carbon and iron as constituent elements and comprising an α' phase as a principal phase, and a vacuum deposition method, a CVD method, an ion beam method, and a laser deposition method may be used.

The iron carbide film comprising an α' phase as a principal phase to be formed in the above step has the advantage that, since the film is formed stably in a so-called As-depo state immediately after forming the film without subjecting it to a heat treatment after forming the film, no thermal effect is exerted on an element consisting of another magnetic film, e.g. a magnetoresistive element, even if the element is formed on the substrate before the iron carbide film is formed.

Furthermore, the iron carbide film comprising an a phase as the principal phase has excellent soft magnetic characteristics such as a saturation magnetic flux density of 2 T or more and a coercive force of 2 Oe or less even in the case of using a conventional film forming process employing a film forming space wherein an ultimate vacuum degree is in the order of $10^{-7}$ Torr.

By forming the iron carbide film with the above construction on the substrate, the surface temperature of which is adjusted to more than 5° C. and less than 100%, the intensity of α' (002) becomes 80% or more of the maximum value, thus making it possible to form an iron carbide film having the desired magnetic characteristics more stably, which is more preferable. If the surface temperature of the substrate is adjusted to more than 10° C. and less than 70° C., the intensity of α' (002) becomes 90% or more of the maximum value, thus making it possible to form an iron carbide film having the desired magnetic characteristics more stably, which is more preferable.

There can be provided a method of producing a magnetic thin film, capable of obtaining various magnetic characteristics described above more stably by comprising the step of heat-treating said substrate in a vacuum space, the step of forming a thin film having almost the same interatomic distance as that of said iron carbide film on a substrate heat-treated in a vacuum space by using any film forming method of a sputtering method, a vacuum deposition method, a CVD method, an ion beam method, and a laser deposition method, and the step of cooling the substrate on which said thin film is formed to at least 100° C. or lower, before the step of forming said iron carbide film.

An iron phase of an a phase having the (200) plane as the surface, i.e. an α—Fe film can be obtained by depositing an iron film as a thin film having almost the same interatomic distance as that of the iron carbide film, on the heated substrate. After cooling the substrate on which the iron film was formed to 100%, an iron carbide film is formed on the iron film, thereby easily forming an iron carbide film of the present invention wherein only a diffraction line from the (002) plane of the above a phase, i.e. α (002) is observed. The substrate temperature for forming the iron film is preferably not lower than 150° C., and more preferably not lower than 200° C.

Examples of the principal element constituting the thin film include one or more elements selected from Ag, Au, Pd, Pt, Rh, Al, Ir, and Ru.

As the method of forming the iron carbide film, for example, there can be preferably used a method of depositing an iron carbide film on a substrate by using an alloy or sintered base metal consisting of at least carbon and iron, or a composite base metal of a combination of a base metal consisting of carbon and a base metal consisting of iron, as a base metal source for forming said iron carbon film, and a process gas consisting of an inert gas.

In place of the above method of forming the iron carbide film, there may be used a method of depositing an iron carbide film on a substrate by using a base metal consisting of at least iron, as a base metal source for forming said iron carbon film, and a process gas consisting of a reactive gas containing carbon as a constituent element.

The above base metal is provided as a generally plate-shaped member called a target when used in the sputtering method, while it is provided as a bulky deposition raw material when used in various deposition methods. When used in the reactive sputtering method and CVD method, a reactive gas containing carbon may be used as portion of, or all of a process gas.

To form an iron carbide film having excellent soft magnetic characteristics such as a saturation magnetic flux density of 2 T or more and a coercive force of 2 Oe or less, the alloy or sintered base metal is preferably a material with a composition consisting of not less than 0.5 atomic % and not more than 15 atomic % of carbon and iron as a balance, and more preferably a material with a composition consisting of not less than 1 atomic % and not more than 12 atomic % of carbon and iron as a balance.

The first method of evaluating a magnetic thin film of the present invention has the feature that it comprises using a X-ray diffraction method as a means for specifying said magnetic thin film as an iron carbide film comprising an α' phase as a principal phase and at least carbon and iron as constituent elements.

The second method of evaluating a magnetic thin film of the present invention has the feature that it comprises using an electron diffraction method as a means for specifying said magnetic thin film as an iron carbide film comprising an α' phase as a principal phase and at least carbon and iron as the constituent elements.

Any crystal structure analysis using the X-ray diffraction method or electron diffraction method is capable of easily specifying the crystal form of the magnetic thin film consisting of an iron carbide film, said iron carbide film comprising an α' phase as a principal phase and at least carbon and iron as constituent elements, during and after film formation without depending on whether an air atmosphere or a vacuum atmosphere is used.

By using the iron carbide film having the saturation magnetic flux density of 2 T or more and coercive force of 2 Oe or less as the magnetic pole material of the recording head, a magnetic head having a higher writing capability than that of a conventional head can be obtained. By using the material having a high saturation magnetic flux density as all or a portion of the upper magnetic pole and/or lower magnetic pole, a strong magnetic field intensity and a strong magnetic field gradient can be attained without excessively saturating the magnetic pole magnetically, thus improving the linear recording density. On the other hand, a magnetic pole material having high saturation magnetic flux density also has the effect of enhancing the truck density. That is, although the intensity of the magnetic field leaked from the recording head is reduced with the decrease of the truck width of the recording head, the intensity of the leakage magnetic field can be maintained when the saturation magnetic flux density is high. Therefore, the truck width can be reduced as compared with the prior art. Accordingly, the magnetic head comprising the magnetic thin film of the present invention as the magnetic pole material of the recording head can write a magnetic signal in a magnetic recording medium having a higher coercive force than that of the prior art at a low noise and high resolution, thereby providing a higher longitudinal recording density.

Although a recording head consisting of a magnetic pole material having a saturation magnetic flux density within a range from about 1.5 to 1.8 T can write in a medium having a coercive force of about 2500 Oe or less, a recording head comprising the magnetic thin film of the present invention as the magnetic pole material has sufficient writing capability even for a medium having a coercive force of about 2500 Oe or more.

Therefore, a magnetic recording device capable of magnetically recording information in a moving magnetic recording medium having a recording density higher than that of the prior art can be obtained by combining a recording head comprising the iron carbide film of the present invention as the magnetic pole material with a magnetic recording medium having a coercive force of 2500 Oe or more. In that case, for example, there can be preferably used an MR (magnetoresistive) head, a GMR (giant magnetoresistive) head or a TMR (tunneling magnetoresistive) head having are producing element (magnetoresistive element) comprising a film, which exerts the magnetoresistive effect capable of changing the resistivity thereof when an external magnetic field is applied.

As the moving magnetic recording medium described above, a longitudinal magnetic recording medium having an axis of easy magnetization which is parallel to the substrate is preferably used, but a perpendicular magnetic recording medium having an axis of easy magnetization which is perpendicular to the substrate may also be used.

Figure 13:
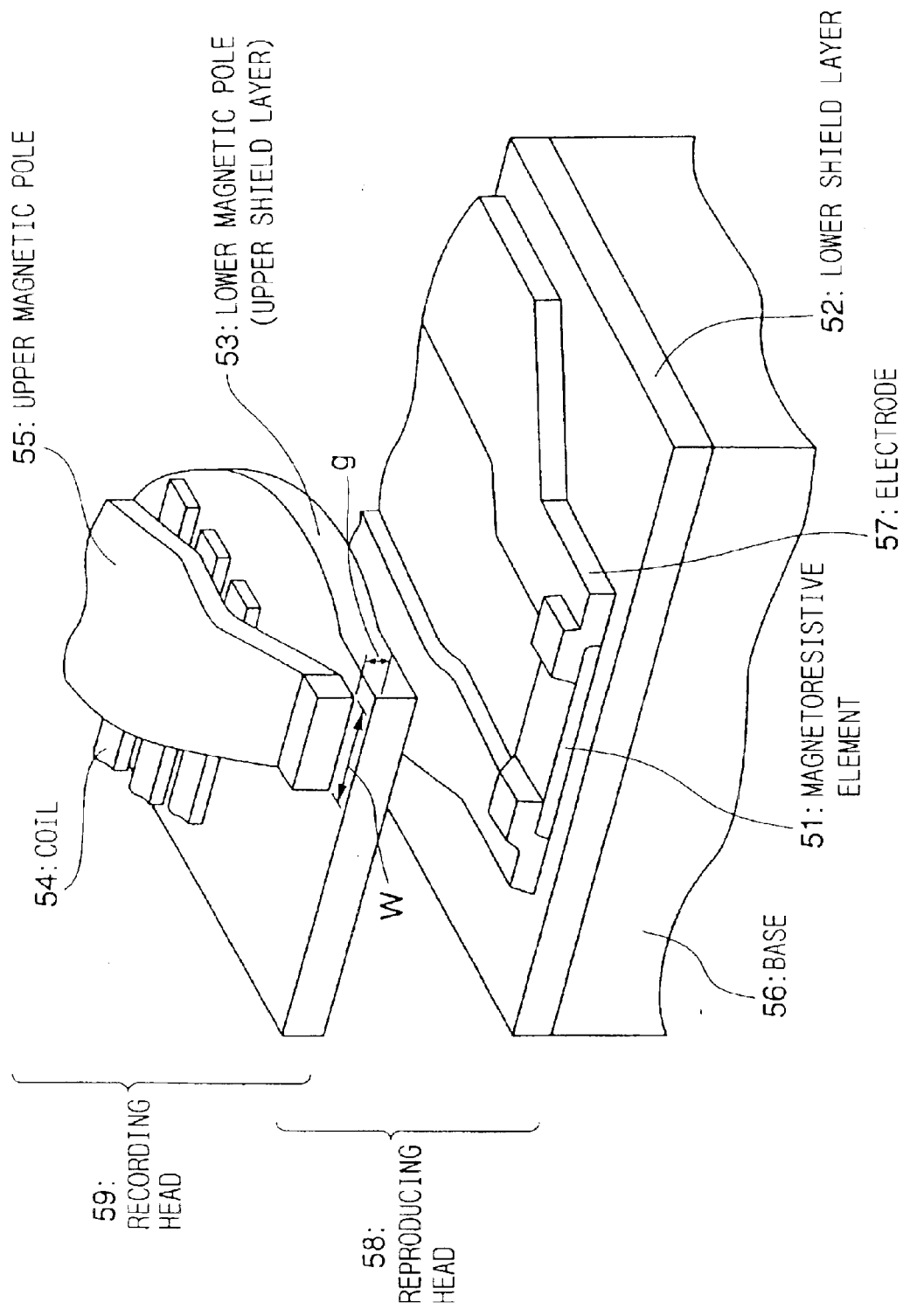
FIG. 13 is a partially cross-sectioned perspective view showing an example of a structure of a magnetic head exclusively for longitudinal magnetic recording.
Figure 17:
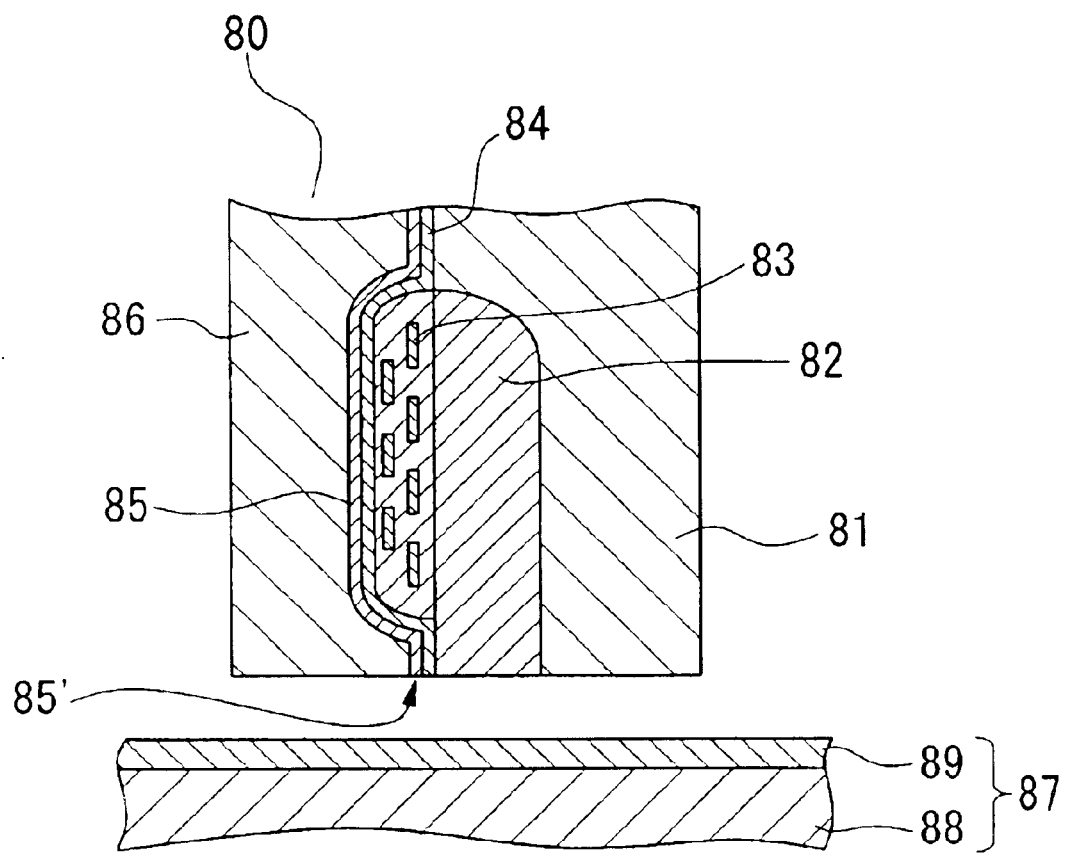
FIG. 17 is a schematic cross-sectional view showing a recording head for perpendicular magnetic recording using an iron carbide film of the present invention as a magnetic pole, and a perpendicular magnetic recording medium.

The recording head comprising the iron carbide film of the present invention as the magnetic pole material can be used not only as the magnetic head for longitudinal magnetic recording as shown in FIG. 13, but also as the magnetic head for perpendicular magnetic recording as shown in FIG. 17. In FIG. 17, the iron carbide film of the present invention is preferably used at least as a magnetic pole 85. In FIG. 17, the reference symbol 80 denotes a recording head for perpendicular recording, 81 denotes a substrate made of, for example, a magnetic material, 82 denotes an insulating material, 83 denotes a coil made of a conductive material, 84 denotes an intermediate layer made of a non-magnetic material, and 86 denotes a protective layer made of an insulating material. The reference symbol 87 denotes a perpendicular magnetic recording medium, 88 denotes a substrate of the perpendicular magnetic recording medium, and 89 denotes a recording layer of the perpendicular magnetic recording medium.

When using the iron carbide film of the present invention, which has excellent soft magnetic properties such as a saturation magnetic flux density of 2 T or more and a coercive force of 1 Oe or less, as the magnetic pole material constituting the recording head 80 for perpendicular recording, a strong leakage magnetic flux can be applied to the recording layer 89 constituting the perpendicular magnetic recording medium 87 even when the area of the magnetic pole section 85' of the recording head as viewed from the side of the perpendicular magnetic recording medium 87 decreases or the thickness thereof decreases.

Accordingly, the recording head 80 comprising the iron carbide film of the present invention as the magnetic pole material contributes to an increase in the recording density not only in the case of longitudinal magnetic recording but also in the case of perpendicular magnetic recording.

Although the above description dealt with the case of employing the iron carbide film of the present invention as the magnetic pole material of the recording head (FIG. 17), the iron carbide film of the present invention may also be employed in a magnetic head which comprises the recording head 80 with, for example, a read head having an MR element incorporated therein, namely a magnetic head having both functions of recording and reproduction.

Figure 18A:
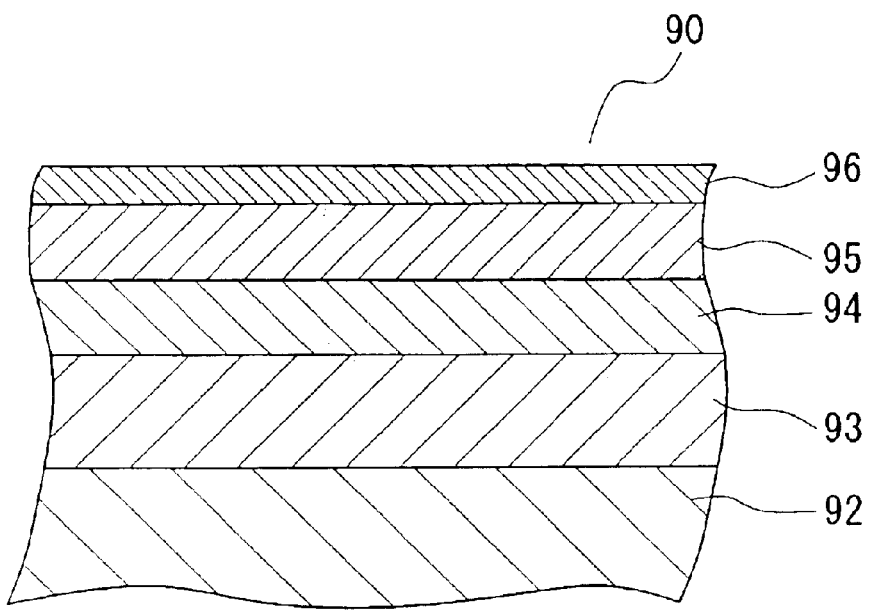
FIG. 18 is a schematic cross-sectional view showing a magnetic device comprising a hard magnetic film, which serves as a recording layer constituting a longitudinal magnetic recording medium, and an iron carbide film of the present invention formed on the hard magnetic film.
Figure 18B:
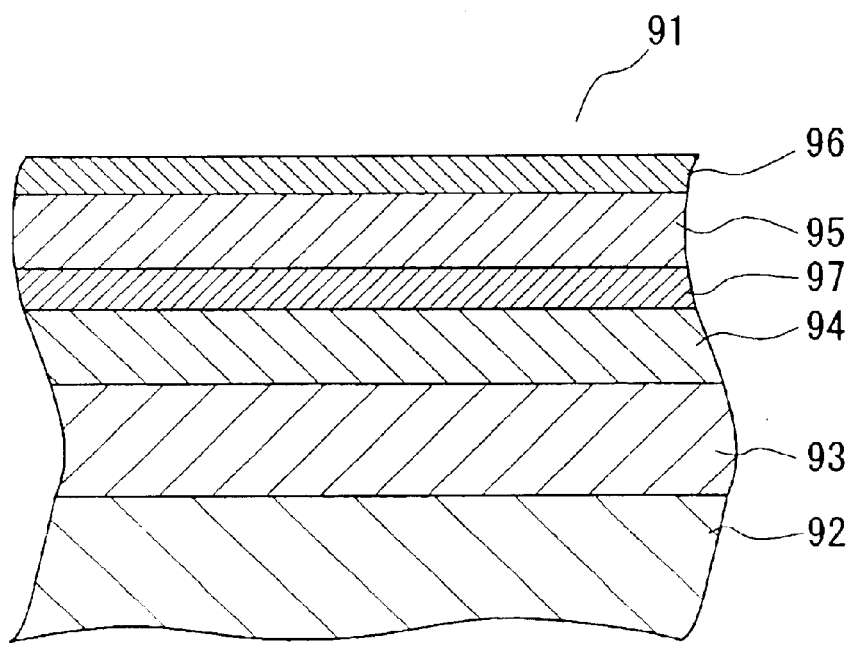

The thin magnetic film comprising the iron carbide film of the present invention can be employed in a magnetic device provided on a hard magnetic film which serves as a recording layer constituting a longitudinal magnetic recording medium. As shown in FIG. 18, two constructions may be employed; (a) a longitudinal magnetic recording medium 90 where a thin magnetic film 95 made of an iron carbide film is formed directly on a recording layer 94 made of a hard magnetic film, and (b) a longitudinal magnetic recording medium 91 wherein an intermediate layer 97 made of a non-magnetic film is formed between the thin magnetic film 95 made of iron carbide and the recording layer 94. The reference symbol 92 denotes a substrate, 93 denotes a metallic underlayer, and 96 denotes a protective layer. In either case, formation of the iron carbide film of the present invention on the hard magnetic film makes it possible to cause the magnetic flux formed by magnetization of the recording layer to return through the inside of the thin magnetic film made of the iron carbide film which has excellent soft magnetic properties, thereby reducing the demagnetization field and maintaining stable magnetization. As a result, the magnetic device with the construction described above has excellent performance in maintaining stable magnetization, even when the domains of magnetization formed in the recording layer become smaller as the recording density increases in the longitudinal magnetic recording.

Figure 19A:
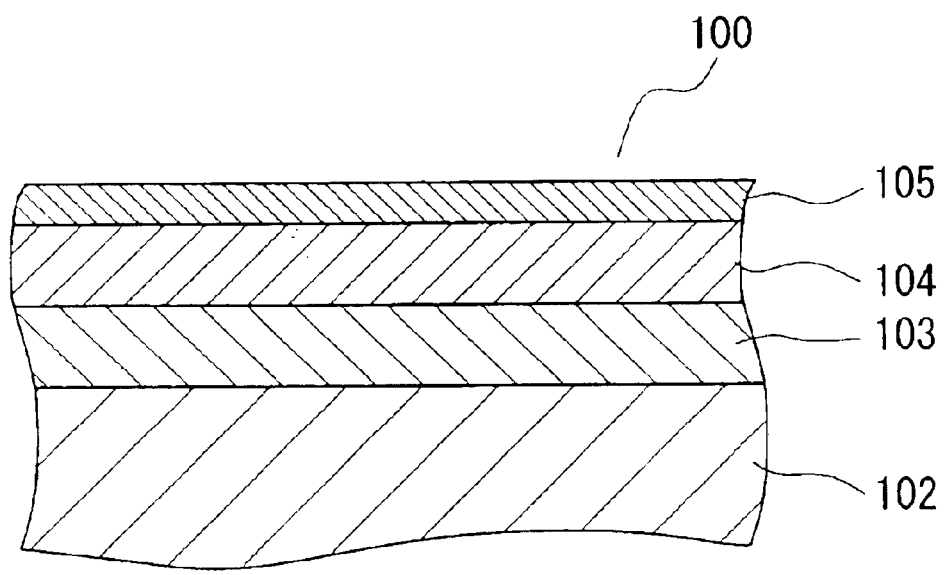
FIG. 19 is a schematic cross-sectional view showing a magnetic device comprising a hard magnetic film, which serves as a recording layer constituting a perpendicular magnetic recording medium, and an iron carbide film of the present invention formed under the hard magnetic film.
Figure 19B:
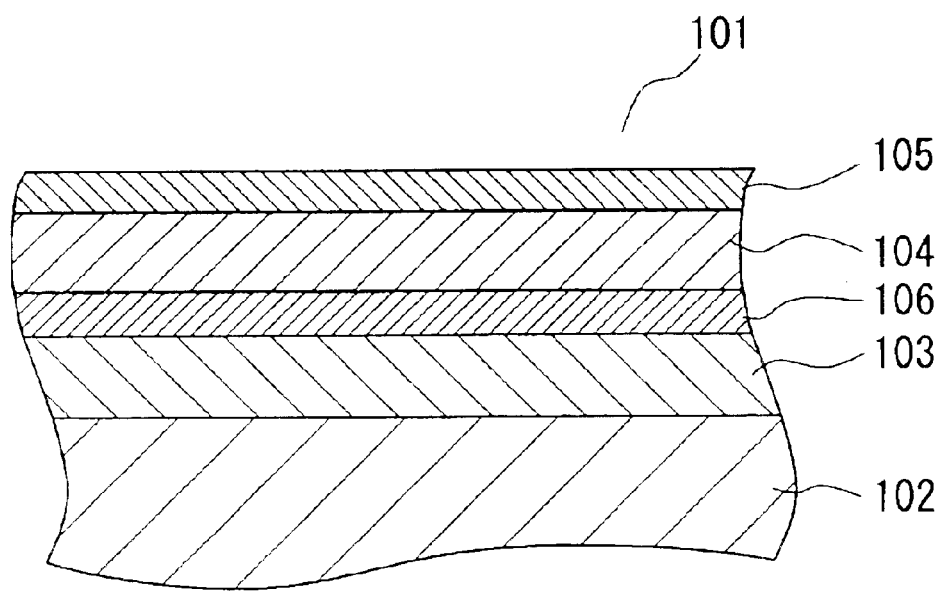

The thin magnetic film comprising the iron carbide film of the present invention can be employed in a magnetic device where the film is formed under a hard magnetic film which functions as a recording layer of a perpendicular magnetic recording medium. As shown in FIG. 19, two constructions may be employed; (a) a perpendicular magnetic recording medium 100 where a thin magnetic film 103 made of the iron carbide film is formed directly under a recording layer 104 made of a hard magnetic film, and (b) a perpendicular magnetic recording medium 101 wherein an intermediate layer 106 made of a non-magnetic film is formed between the thin magnetic film 103 and the recording layer 104. The reference symbol 102 denotes a substrate, and 105 denotes a protective layer. In either case, formation of the iron carbide film of the present invention under the hard magnetic film makes it possible to make the magnetic field generated by the magnetic poles of the recording head stronger than in the case of using the soft magnetic film having the saturation magnetic flux density less than 2 T, and therefore the recording layer can be vertically magnetized more easily.

This means that the magnetic field generated by the magnetic poles of the recording head can be maintained at a sufficient level even when the area of the magnetic pole of the recording head as viewed from the side of the medium is reduced. Thus the magnetic device provided with the iron carbide film of the present invention located under the hard magnetic film which functions as the recording layer can contribute to the increase in the recording density of perpendicular magnetic recording.

Figure 20A:
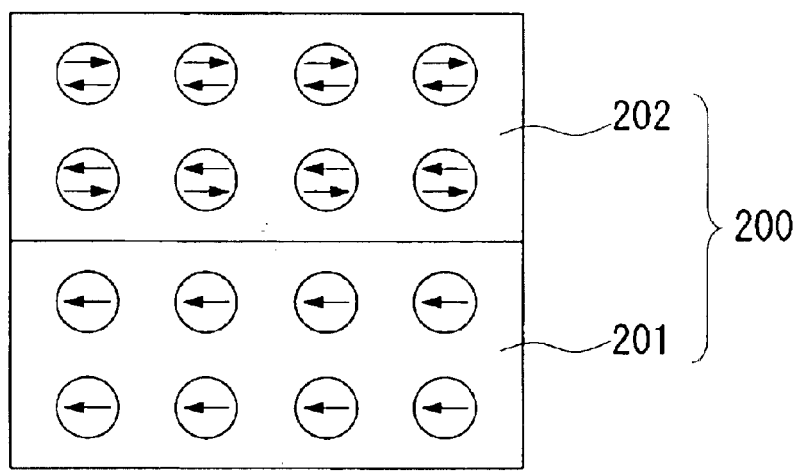
FIG. 20 is a schematic cross-sectional view showing a magnetic device using an iron carbide of the present invention as a soft magnetic layer constituting an exchange-spring magnet or a spin transistor magnet.
Figure 20B:
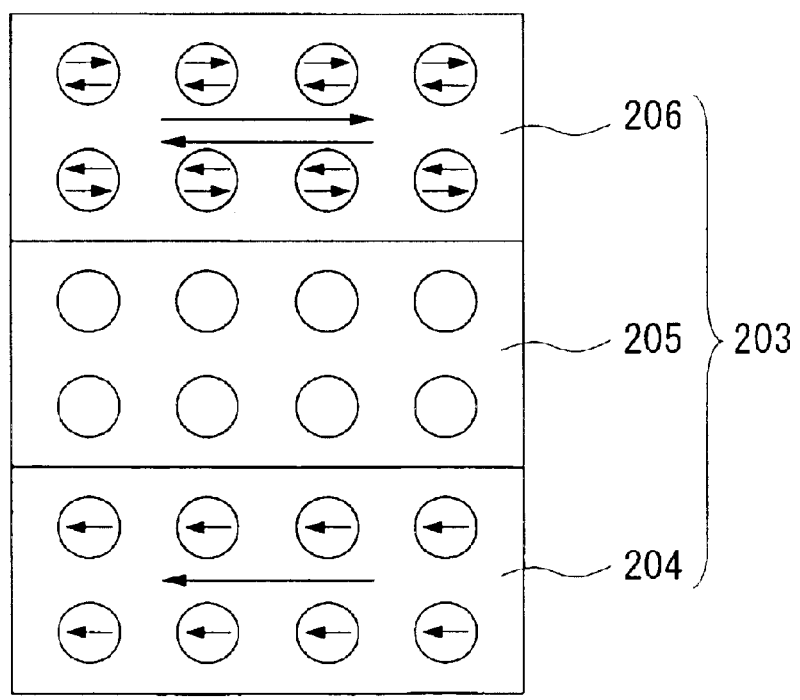

The thin magnetic film comprising the iron carbide film of the present invention can be used in a magnetic device where a soft magnetic layer is used to constitute an exchange-spring magnet or a spin transistor magnet. FIG. 20(a) is a schematic cross-sectional view showing an exchange-spring magnet 200 consisting of a hard magnetic layer 201 having thickness of several nanometers and a soft magnetic layer 202, FIG. 20(b) is a schematic cross-sectional view showing a spin transistor magnet 203 consisting of a hard magnetic layer 204 having a thickness of several nanometers, a non-magnetic layer 205 and a soft magnetic layer 206.

Such materials which perform, when measuring in a mesoscale size of several tens of atoms, specific device functions are generally called mesoscopic materials. In the exchange-spring magnet 200 which has a two-layer structure consisting of the hard magnetic layer 201 and the soft magnetic layer 202, an exchange bonding force is generated between the two layers at the mesoscopic level and the demagnetization curve shows a spring-like behavior, and is therefore called the spring magnet. As a result, it is made possible to break the limitation in the energy product of the magnet of the prior art, and to make a remarkable magnet exceeding 100 MGOe. At the same time, a spin valve function is produced between the layers so that a compound device material which also has GMR function can be made.

In the spin transistor magnet 203, on the other hand, the hard magnetic layer 204 serves as an emitter, the non-magnetic layer 205 serves as a base and the soft magnetic layer 206 serves as a collector. That is, when a bias current is kept flowing between the hard magnetic layer 204 and the non-magnetic layer 205, spin electrons (indicated by →) in the hard magnetic layer 204 are injected into the non-magnetic layer 205 and become minority carriers. When the non-magnetic layer 205 has a mesoscopic level thickness, the spin electrons (indicated by →) reach the soft magnetic layer 206 within the lifetime thereof. At this time, the spin electrons may flow into the soft magnetic layer 206 or may be rejected depending on the direction of the magnetization of the soft magnetic layer 206. Thus the current flowing in the collector circuit is switched between +, 0 and −states, so that it is expected to perform the function of a transistor.

However, for the exchange-spring magnet 200 and the spin transistor magnet 203 to function in a stable condition, the soft magnetic films 202, 206 which constitute the magnets are required, when formed with an extremely small thickness of several nanometers, to have a plane of easy magnetization within the film surface and be capable of maintaining excellent soft magnetic properties. Since the iron carbide film of the present invention has an axis of easy magnetization lying in the surface of the thin film in the stage after film formation (as deposited) even in an extremely thin film region [mesoscopic region (layer of thickness corresponding to several tens of atoms)], i.e., a post-heating (annealing) process is unnecessary, there is the advantage that diffusion in the interface due to post heating does not occur.

The iron carbide film of the present invention is just capable of satisfying the characteristics requirements described above as deposited, and is therefore very preferably used as a material to make the soft magnetic layers 202, 206 which constitute the exchange-spring magnet 200 and the spin transistor magnet 203.

The soft magnetic film of the prior art, on the contrary, requires heat treatment after forming the film in order to satisfy the characteristics requirements described above. Consequently, a soft magnetic film about several nanometers thick is likely to experience diffusion through the interface with the hard magnetic film 201 in the case of the exchange-spring magnet or with the non-magnetic film 205 in the case of the spin transistor magnet, and therefore it is practically difficult to form a laminate which has a size on the nanometer order, and it has been difficult to make a structure which makes an exchange-spring magnet or the spin transistor magnet.

Figure 21A:
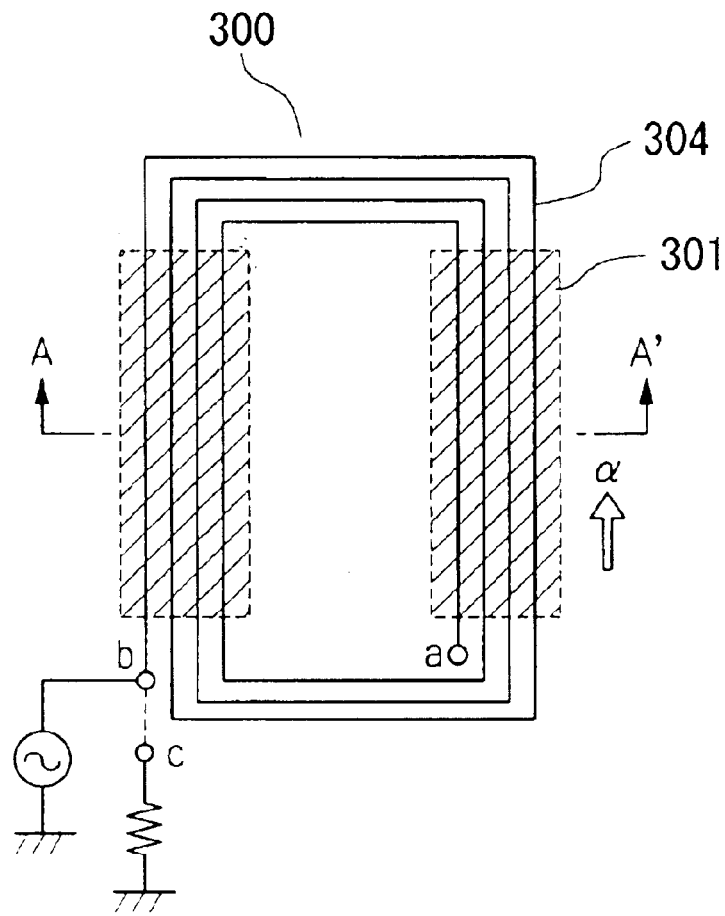
FIG. 21(a) is a schematic plan view showing a magnetic device using an iron carbide film of the present invention as at least portion of a transmission line constituting a magnetic sensor.
Figure 21B:
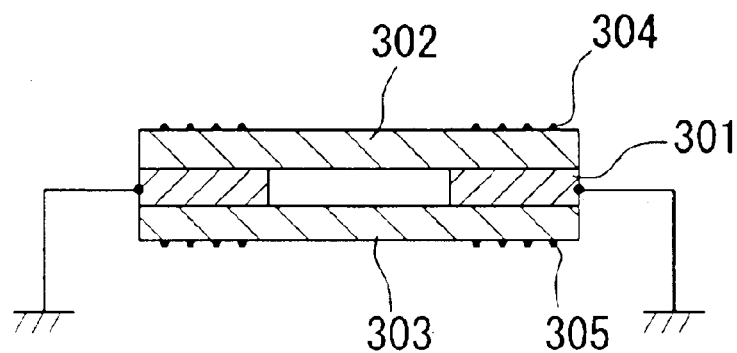
FIG. 21(b) is a schematic cross-sectional view of the A–A' section.

The thin magnetic film comprising the iron carbide film of the present invention can be employed in a magnetic device made by using the film in at least a portion of a transmission line constituting a magnetic field sensor. An example of the transmission line constituting a magnetic field sensor 300 is shown in FIG. 21 where the iron carbide film of the present invention is used for a grounded magnetic layer 301, conductive lines having a spiral configuration are provided via insulation layers 302, 304 above and under the magnetic film 301. The upper conductive line 304 disposed on the top surface of the insulation layer 302 is connected at a terminal a to the lower conductive line 305 which is disposed on the bottom surface of the insulation layer 303. Thus a terminal b of the upper conductive line 304 and a terminal c of the lower conductive line 306 are connected in series via the terminal a.

Since the transmission line with the construction described above changes its transmission characteristics as the magnetic susceptibility of the magnetic layer 301 is changed by an external magnetic field, the transmission line can be employed as a magnetic sensor. However this requires it to align the axis of easy magnetization of the magnetic layer 301 in the direction where the transmission line extends (direction indicated by arrow a). In contrast, the iron carbide film of the present invention has a feature of growing with the plane of easy magnetization thereof corresponding to the substrate surface after forming the film, and is therefore capable of providing the functions which are required of the magnetic layer 301 under stable conditions. Therefore, the magnetic sensor with the construction described above can be made easily by using the iron carbide film of the present invention as the magnetic layer 301.

Figure 22:
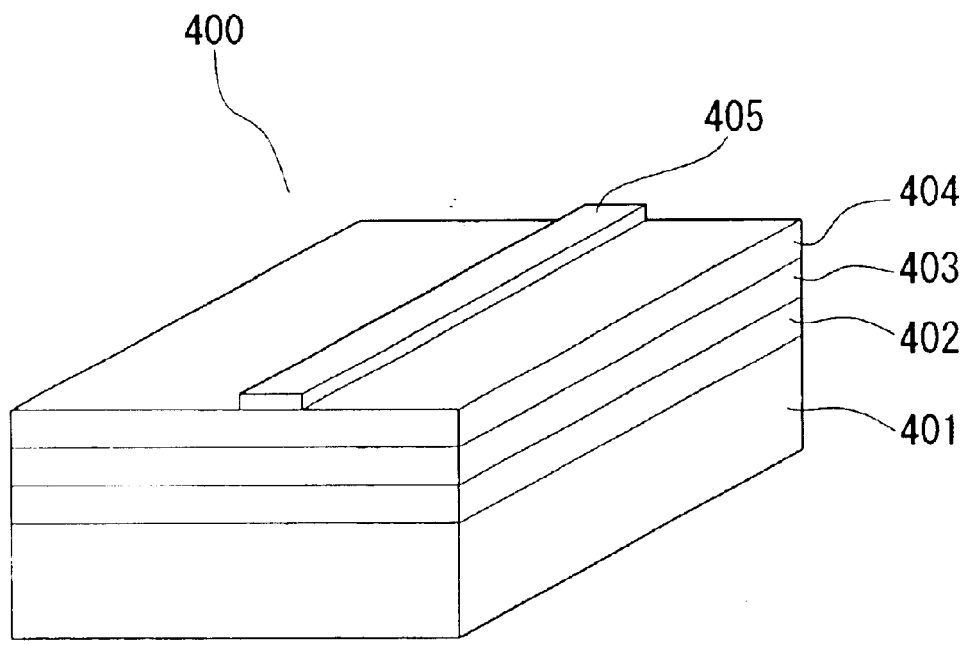
FIG. 22 is a schematic perspective view showing a magnetic device using an iron carbide film of the present invention as at least portion of a transmission line constituting a high frequency passive device.

The thin magnetic film comprising the iron carbide film of the present invention can be used in a magnetic device made by using the film in at least a portion of a transmission line constituting a high frequency passive device. An example of the transmission line constituting the high frequency passive device 400 is shown in FIG. 22 where the iron carbide film of the present invention is used as a magnetic layer 403 which is disposed on a substrate 401 made of an insulation material so as to be interposed by insulation layers 402, 404, and a transmission line 405 made of a conductive material is disposed on an insulation layer 404 located on the magnetic layer 403.

In the high frequency passive device with the construction described above, it is known that addition of the magnetic layer 403 increases the impedance of the transmission line itself, so that the wavelength of a signal propagating through the transmission line 405 can be made shorter. In order to achieve this effect stably, the saturation magnetic flux density of the magnetic layer 403 is preferably higher. Therefore, a high frequency passive device having excellent stability can be made by using the iron carbide film of the present invention which has a saturation magnetic flux density exceeding 2 T for the magnetic layer 403.

The thin magnetic film comprising the iron carbide film of the present invention can be employed in a magnetic device made by using the film in at least portion of a transmission line constituting a micro transformer or a micro inductor. As used herein, the term "micro transformer" refers to a device intended for use in a relatively low frequency band within several tens of MHz, and the term "micro inductor" refers to a device intended for use in a frequency band higher than several tens of MHz.

Figure 23:
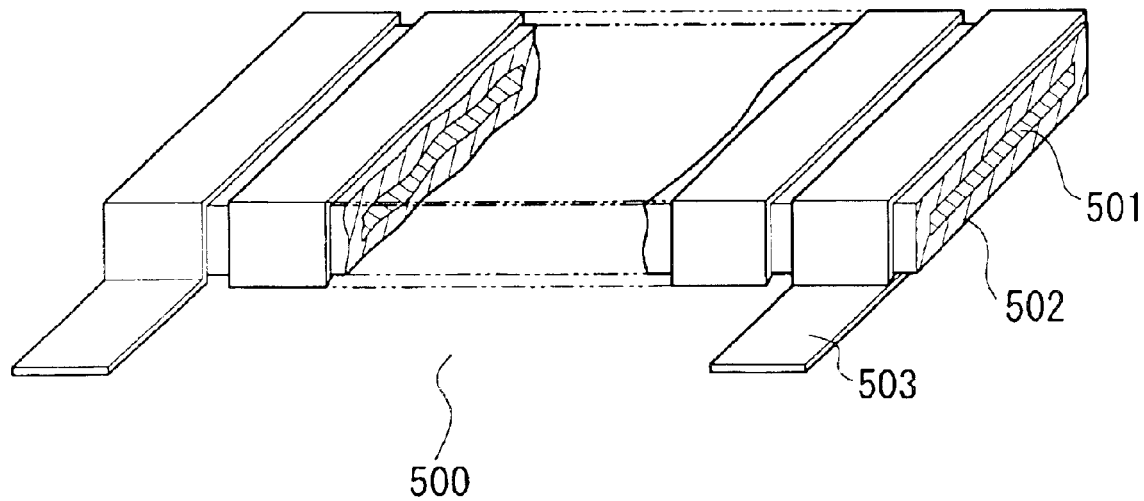
FIG. 23 is a schematic perspective view showing a magnetic device using an iron carbide film of the present invention as at least portion of a transmission line constituting a micro transformer or a micro inductor.

An example of a transmission line constituting a micro transformer or a micro inductor 500 is shown in FIG. 23 where an insulating material 502 is disposed around a magnetic layer 501 made of the iron carbide film of the present invention and a transmission line 503 made of a conductive material is wound around the insulating material 502 so as not to overlap.

In the micro transformer or the micro inductor with the construction described above, it is known that the use of the material having high saturation magnetic flux density for the magnetic layer 501 increases the current capacity of the transmission line 503. Therefore, the micro transformer or the micro inductor which is capable of stably carrying a large current can be made by using the iron carbide film of the present invention which has a saturation magnetic flux density exceeding 2 T for the magnetic layer 501. Also because there is a tendency for the resonance point of permeability to shift towards high frequencies as the saturation magnetic flux density Bs of the magnetic layer 501 increases the micro transformer or the micro inductor which employs the iron carbide film of the present invention which has a saturation magnetic flux density exceeding 2 T for the magnetic layer 501 is expected to have excellent high frequency characteristics.

EMBODIMENTS

The following embodiments further illustrate the present invention in detail, but the present invention is not limited by these embodiments.

(Embodiment 1)

Figure 12:
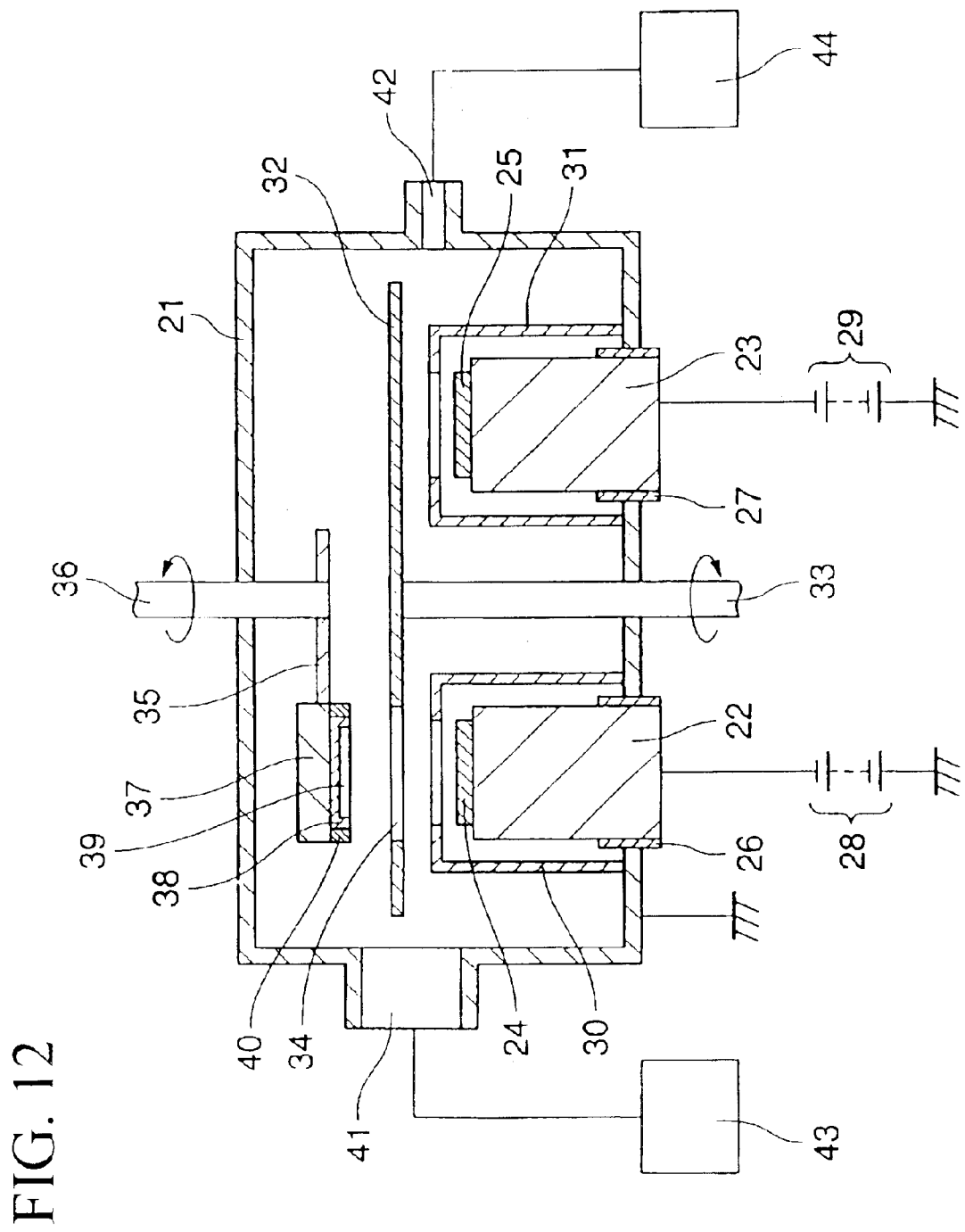
FIG. 12 is a schematic cross-sectional view showing a DC magnetron sputtering device used to make magnetic thin film samples of the embodiments.

In this embodiment, a magnetic layer 11 with a film composition consisting of 0 to 20 atomic % of C and iron (Fe) as a balance was deposited on a substrate 10 by sputtering using a sputtering device shown in FIG. 12.

FIG. 1(a) is a schematic cross-sectional view showing the layer structure of a thin magnetic film sample of this embodiment, where the reference symbol 10 denotes a substrate and 11 denotes a magnetic layer.

A glass substrate (#7059 manufactured by Corning Co.) was used as the substrate 10, while the film composition of the magnetic layer 11 to be made was changed by changing the composition of a second target 25, made of an iron carbide (Fe—C) alloy which was used in the film formation, and sputtering. In the device shown in FIG. 12, the ultimate vacuum degree in the film forming chamber 21 used to form the magnetic layer 11 made of an iron carbide (α'—Fe—C) film was fixed to the order of $10^{-7}$ Torr, while a magnetic field applying means 40 was used during the film formation process to apply a magnetic field (the intensity being 30 to 50 Gauss (G)) in a direction parallel to the deposition surface of the substrate 39. Before forming the film, the substrate 39 was heat-treated at 200° C. in a vacuum for two hours and then the substrate 39 was cooled to 20° C. and the iron carbide film with a desired composition was deposited on the substrate 39 kept at this temperature.

In this embodiment, the iron carbide film was formed by using the target made of the alloy of Fe and C which was made by the vacuum melting process. However, sputtering methods which use a target consisting of Fe and C made by sintering, a compound target consisting of a C chip disposed on an Fe target or using an Fe target and a C target separately, or other methods of forming the film such as laser deposition or an ion beam method may also be employed. Further, a technique of forming the iron carbide film by using a process gas including the element C and an Fe target may also be employed.

FIG. 12 is a schematic cross-sectional view showing a direct current magnetron sputtering device used in forming the iron carbide film of the present invention.

In the device shown in FIG. 12, the reference symbol 21 denotes a film forming chamber, 22 denotes a cathode provided on one side in the bottom of the film forming chamber 21 for forming a buffer layer, 23 denotes a cathode provided on the other side in the bottom of the film forming chamber 21 for forming a magnetic film, 24 denotes a first target which is made of Fe and is disposed on the cathode 22 for the formation of the magnetic film, 25 denotes a second target which is made of Fe—C and disposed on the cathode 23 for the formation of the magnetic film, 26 and 27 denote insulating members for the cathodes, 28 and 29 denote direct current power sources which supply electric power to the cathodes, 30 and 31 denote earth shields for the cathodes, 32 denotes a shutter, 33 denotes a shutter rotating means, 34 denotes an aperture of the shutter, 35 denotes a substrate holder supporting member, 36 denotes rotating means for the substrate holder supporting member, 37 denotes a temperature control means for the substrate, 38 denotes a substrate holder, 39 denotes a substrate, 40 denotes a magnetic field applying means which applies a magnetic field in a direction parallel to the deposition surface of the substrate, 41 denotes an exhaust port, 42 denotes a gas inlet port, 43 denotes a pumping means, and 44 denotes a gas supply source.

The film forming chamber 21 is connected via the exhaust port 41 to the pumping means 43 such as a vacuum pump so as to evacuate the inside of the film forming chamber 21 to a desired degree of vacuum. The film forming chamber 21 has the gas inlet port 42, so as to supply the process gas used in the film forming process or other purpose, for example Ar gas or nitrogen gas, from the gas supply source 44 via the gas inlet port 42 into the film forming chamber 21.

The device shown in FIG. 12 also has the shutter 32 which is disposed between the substrate holder 38 located in the upper section of the inner space of the film forming chamber 21 and the cathodes 22, 23 located in the lower section, and separates these members in space. The shutter 32 is rotatably supported at the center thereof by the rotating means 33 comprising a rotating shaft disposed to penetrate the center of bottom of the film forming chamber 21. The shutter 32 has the aperture 34 located at a position to oppose the cathode when viewed from the substrate 39 side. The aperture 34 can be moved to a position located above the cathode 22 or the cathode 23 by rotating the shutter 32 by means of the rotating means 33.

On the other hand, the substrate holder 38 which has the function to support the substrate 39 with the film forming side thereof facing toward the cathode is fastened onto one end of the substrate holder supporting member 35, together with the temperature control means 37 which has the function of applying heat treatment, cooling or maintaining a constant temperature of the substrate 39. The other end of the substrate holder supporting member 35 is rotatably supported by the rotating means 36 comprising a rotating shaft disposed to penetrate the center of top of the film forming chamber 21.

Therefore, the buffer layer is formed on the substrate 39 by controlling the position of the shutter 32 so that the shutter aperture 34 is not located between the substrate 39 and the cathode 22, introducing the process gas via the gas inlet port 42 into the film forming chamber 21, applying a desired level of electric power from the direct current power source 28 to the cathode 22 thereby to generate electric discharge under a predetermined gas pressure, then moving the substrate 39 to a position above the cathode 22 by the rotating means 36, and moving the shutter 32 by the rotating means 33 so that the shutter aperture 34 is located between the substrate 39 and the cathode 22. During this process, the thickness of the thin film to be formed is controlled to a desired value by adjusting the period of time when the shutter aperture 34 stays between the substrate 39 and the cathode 22, the deposition rate and other factors.

Table 1 given below shows the principal conditions of forming the iron carbide film according to this embodiment on a glass substrate.

TABLE 1

| | |
|---|---|
| Film forming method | DC magnetron sputtering method |
| Substrate material | Glass (#7059) |
| Substrate shape | 8 mm square |
| Substrate surface condition | Mirror-finished, Ra < 1 nm |
| Ultimate vacuum degree in film forming chamber | order of $10^{-7}$ Torr |
| Process gas | Ar gas |
| Impurity concentration in Ar gas | 110 ppb or less |
| Ar gas pressure | 10 mTorr (1.33 Pa) |
| Holding temperature of substrate surface | 200° C. (pre-treatment) 20° C. (during formation of α'-Fe—C film) |
| Target material | Fe—C (C: 0 to 20 atomic %, Fe as balance) |
| Target diameter | 4 inches |
| Purity of target material | 3 N (Fe—C) |
| Distance between target and substrate | 50 mm |
| Power imparted to target | DC 200 W (Fe—C) |
| Magnetic field applied to substrate | Direction of application: one direction parallel to the film forming surface of the substrate Intensity of magnetic field: 30 to 50 G |
| Thickness of film formed | 300 nm (α'-Fe—C) |
| Film deposition rate | 0.4 nm/sec (α'-Fe—C) |

The method of forming the iron carbide film according to this embodiment will be described below in the order of the process.

Parenthesized numbers indicate the step numbers of the sequence.

(a1) After setting the substrate 39, which had been subjected to a predetermined cleaning process, on the substrate holder 38, the inside of the film forming chamber 21 was pumped out to a vacuum degree on the order of $10^{-7}$ Torr (1 Torr is approximately 133 Pa) through the exhaust port 41 by using the pumping means 43. The substrate holder 38 was disposed above the target 24. The film forming chamber 21 was kept at the ground potential. A means for applying magnetic field in one direction parallel to the film forming surface of the substrate 39 was provided outside of the substrate holder 38.

(a2) The substrate 39 was heated via the substrate holder 38 with the temperature control means 37 to heat and keep the surface temperature of the substrate 39 at about 200%.

(a3) The substrate 39 was cooled down via the substrate holder 38 with the temperature control means 37 to 20%.

(a4) The substrate holder 38 was moved to a position above the target 25 by using the rotating means 36.

(a5) Ar gas was introduced through the gas inlet port 42 into the film forming chamber 21 and the gas pressure was controlled at 10 mTorr by means of a mass flow controller (not shown).

(a6) A predetermined level of DC power was supplied from a direct current power source 29 to the cathode 23 thereby applying preliminary sputtering to the target 25 for several minutes. At this time, the shutter 32 was disposed to block the sight of the second target 25 from the side of the substrate 39 (FIG. 12).

(a7) The shutter 32 was moved by using the rotating means 33 so that the aperture 34 of the shutter 32 was located right above the second target 25 (not shown). Then the shutter 32 was operated to open or close thereby to form a magnetic layer 11 consisting of α'—Fe—C film 300 nm in thick on the substrate 10. At this time, the composition of the α'—Fe—C film was controlled by using an Fe—C alloy target with a desired composition.

The rate of forming the α'—Fe—C film (0.4 nm/sec) in this embodiment is 130 to 200 times faster than the film deposition rate given in reference publication 3 described in conjunction with the prior art (0.002 to 0.003 nm/sec), and is sufficient for use in a mass-production process.

(a8) After forming the magnetic layer 11, the DC power applied to the cathode 23 was reduced to zero, thereby to stop the electric discharge.

(a9) After stopping the introduction of the Ar gas into the film forming chamber 21, nitrogen gas was introduced with the inner pressure of the film forming chamber 21 reaching the atmospheric pressure, then the produced sample which was taken out of the film forming chamber 21.

Samples (FIG. 1(a)) made in the steps (a1) to (a9) described above having the layer structure of the substrate 10/α'—Fe—C film will be referred to as sample S1.

(Embodiment 2)

Figure 1B:
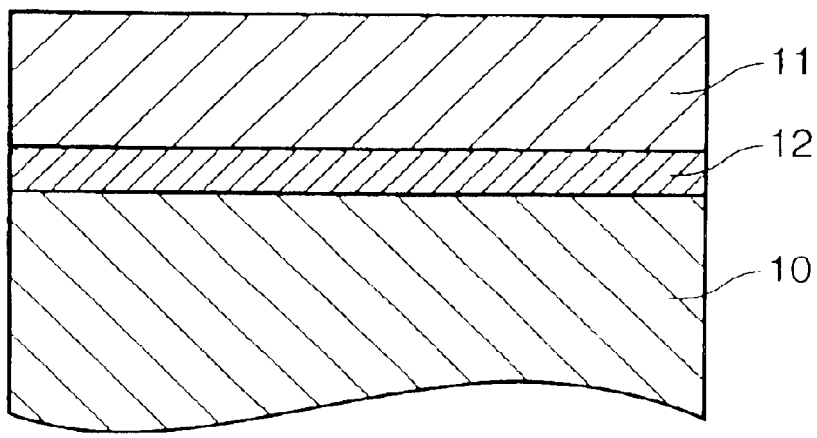

This embodiment is different from the first embodiment in that the layer structure of FIG. 1(a) was replaced by the layer structure of FIG. 1(b) wherein the magnetic layer 11 consisting of the α'—Fe—C film was formed on the substrate 10 by sputtering via the buffer layer 12 comprising Fe film thereby making a sample (referred to as sample S2). This sample was made by using the sputtering device shown in FIG. 12 similarly to the first embodiment.

A Fe target having a high purity level 4N was used in making the Fe film 12. The ultimate vacuum degree in the film forming chamber wherein the α'Fe—C film 11 and the Fe film 12 were formed was fixed to the order of $10^{-7}$ Torr, while applying a magnetic field (intensity from 30 to 50 G) in one direction parallel to the film forming surface of the substrate 10. Before forming the film, the substrate 10 was subjected to heat treatment at 200° C. in a vacuum for two hours and, after forming the Fe film 12 on the substrate 10 kept at a temperature of 200° C., the substrate 10 was cooled to 20° C. and the magnetic layer 11 consisting of the a α'Fe—C film with the desired composition was deposited on the buffer layer 12 consisting of the Fe film of the substrate 10 kept at this temperature.

The process was the same as that of the first embodiment with regards to other points.

Table 2 given below shows the major conditions of forming the magnetic layer 11, which comprises the α'—Fe—C film according to this embodiment, on the substrate 10 made of glass via the buffer layer 12 comprising the Fe film.

TABLE 2

| Film forming method | DC magnetron sputtering method |
|---|---|
| Substrate material | Glass (#7059) |
| Substrate shape | 8 mm square |
| Substrate surface condition | Mirror-finished, Ra < 1 nm |
| Ultimate vacuum degree in film forming chamber | order of $10^{-7}$ Torr |
| Process gas | Ar gas |
| Impurity concentration in Ar gas | 110 ppb or less |
| Ar gas pressure | 10 mTorr |
| Holding temperature of substrate surface | 200° C. (pre-treatment) 200° C. (during formation of Fe film) 20° C. (during formation of α'-Fe—C film) |
| Target material | Fe—C (C: 0 to 20 atomic %, Fe as balance) |
| Target diameter | 4 inches |
| Purity of target material | 4 N (Fe), 3 N (Fe—C) |
| Distance between target and substrate | 50 mm |
| Power imparted to target | DC 200 W (Fe—C) |
| Magnetic field applied to substrate | Direction of application: one direction parallel to the film forming surface of the substrate Intensity of magnetic field: 30 to 50 G |
| Thickness of film formed | 0.05 nm (Fe), 300 nm (α'-Fe—C) |
| Film deposition rate | 0.05 nm (Fe), 0.4 nm/sec (α'-Fe—C) |

The method of forming the magnetic film according to this embodiment will be described below in the sequential order of the process.

Parenthesized numbers indicate the step number of the sequence.

(b1) After setting the substrate 39, which had been subjected to a predetermined cleaning process, onto the substrate holder 38, the inside of the film forming chamber 21 was pumped out to a vacuum degree in the order of $10^{-7}$ Torr through the exhaust port 41 by the pumping means 43. The substrate holder 38 was disposed above the first target 24 made of Fe. The film forming chamber 21 was kept at the ground potential. The magnetic field applying means 40 was provided outside of the substrate holder 38 for applying magnetic field in one direction parallel to the film forming surface of the substrate 39.

(b2) The substrate 39 was subjected to heat treatment via the substrate holder 38 with the temperature control means 37 to heat and keep the surface temperature of the substrate 39 at about 200° C.

- (b3) Ar gas was introduced through a gas inlet port 42 into the film forming chamber 21 and the gas pressure was controlled at 10 mTorr by means of the mass flow controller (not shown).
- (b4) A predetermined level of direct current power was supplied from the direct current power source 28 to the cathode 22 thereby applying preliminary sputtering to the first target 24 for several minutes. At this time, the shutter 32 was disposed to block the sight of the target 24 from the side of the substrate 39 (Not shown).
- (b5) The shutter 32 was moved by using the rotating means 33 so that the aperture 34 of the shutter 32 was located right above the first target 24 (FIG. 12). Then the shutter 32 was operated to open or close thereby to form the buffer layer comprising Fe film 5 nm in thick on the substrate 39.
- (b6) After forming the buffer layer, the direct current power applied to the cathode 22 was reduced to zero, thereby to stop the discharge. Then the introduction of Ar gas was stopped and the inside of the film forming chamber 21 was pumped out to a vacuum level on the order of $10^{-7}$ Torr and then, under this condition, the substrate 39 was cooled down via the substrate holder 38 with the temperature control means 37 to 20° C.
- (b7) The substrate holder 38 was moved to a position above the second target 25 by using the rotating means 36.
- (b8) Ar gas was introduced through the gas inlet port 42 into the film forming chamber 21 and the gas pressure was controlled at 10 mTorr by means of the mass flow controller (not shown).
- (b9) A predetermined level of direct current power was supplied from the direct current power source 29 to the cathode 23 thereby applying preliminary sputtering to the second target 25 for several minutes. At this time, the shutter 32 was disposed to block the sight of the second target 25 from the side of the substrate 39 (FIG. 12).
- (b10) The shutter 32 was moved by using the rotating means 33 so that the aperture 34 of the shutter 32 was located right above the second target 25 (not shown). Then the shutter 32 was operated to open or close thereby to form a magnetic layer consisting of α'—Fe—C film 300 nm in thickness on the Fe film. At this time, the composition of the α'Fe—C film was controlled by using an Fe—C alloy target with a desired composition.
- (b11) After forming the magnetic layer, the direct current power applied to the cathode 23 was reduced to zero, thereby to stop the electric discharge.
- (b12) After stopping the introduction of the Ar gas into the film forming chamber 21 and nitrogen gas was introduced with the inner pressure of the film forming chamber 21 reaching the atmospheric pressure, the sample which has been made was taken out of the film forming chamber 21.

In the process (b1) through (b12) described above, a sample S2 (FIG. 1(*b*)) comprising the magnetic layer 11 having a layer structure of the substrate 10/Fe buffer layer 12/α'—Fe—C film was made.

FIG. 2 is a graph showing the results of X-ray diffraction analysis of the crystal structure of the sample S1 comprising the magnetic layer of the representative α'—Fe—C film made in the first embodiment, by using the Co—Kα radiation.

As shown in FIG. 2, the iron carbide film 11 comprising the α'phase as the principal phase in the composition described above is identified by observing the diffraction line from the (002) plane of the α'phase, namely mainly including α' (002) by X-ray diffraction analysis. In FIG. 2, (a) shows a case where the diffraction line from the (002) plane of the iron carbide film forms a principal peak with a broad shoulder being observed on the side of higher angle thereof, and (b) shows a case where only the diffraction line from the (002) plane of the iron carbide film is observed.

To sum up, the iron carbide film 11 composed of constituted from the diffraction line from the (002) plane of the α' phase and the other diffraction line, namely the broad shoulder section (hatched section) being observed on the side of higher angle, as is apparent from FIG. 2(*a*).

If the other diffraction lines described above disappear and a single crystal is formed, the iron carbide film 11 is composed only of the single phase of the α' phase, and only the diffraction line from the (002) plane of the α' phase as shown in FIG. 2(*b*) is observed.

Figure 3:
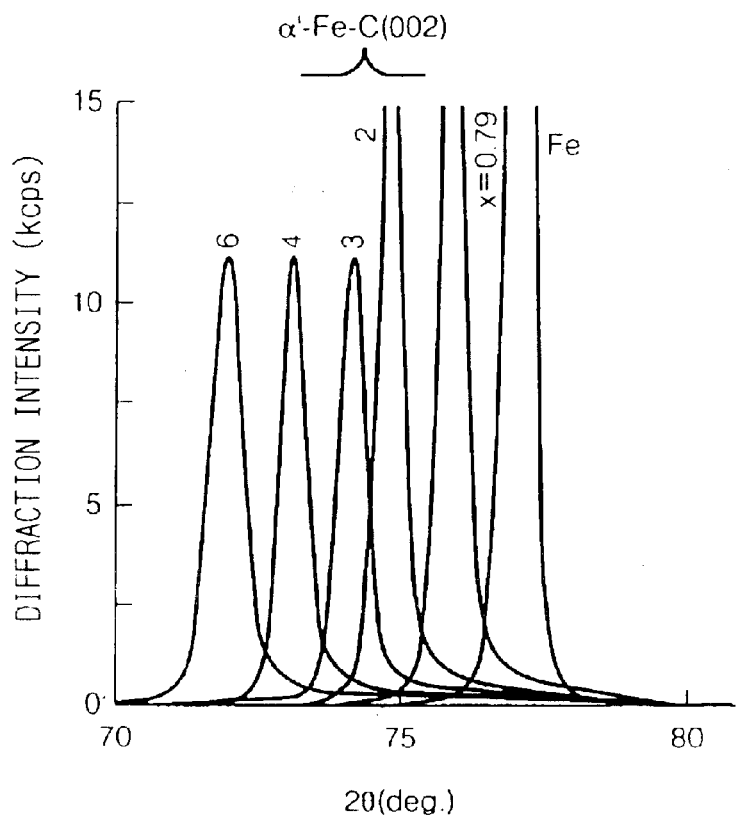
FIG. 3 is a graph showing the results of a sample Si made in the first embodiment by means of a X-ray diffraction method.
Figure 4:
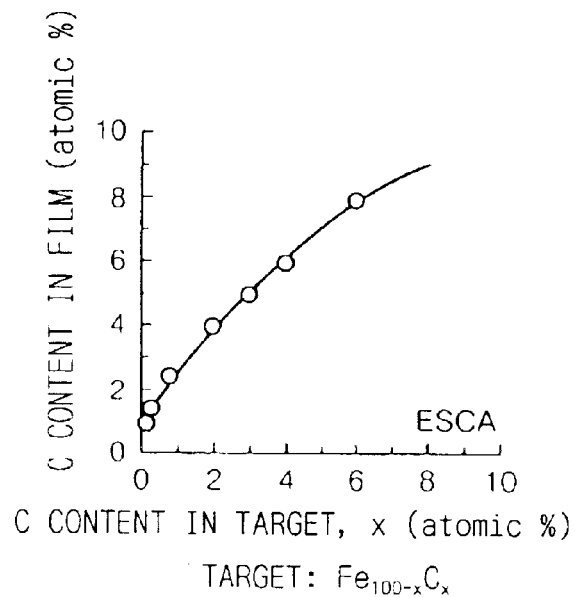
FIG. 4 is a graph showing the relationship between the carbon content of a Fe—C alloy target used for forming a film in the first embodiment (abscissa) and the carbon content of the formed iron carbide film (ordinate).

FIG. 3 is a graph showing the results of X-ray diffraction analysis of the crystal structure of the sample S1 with a different composition of the α'—Fe—C film made in the first embodiment, by using the Co—K a radiation. It should be noted that FIG. 3 shows a sample where only the diffraction line from the (002) plane of the α' phase shown in FIG. 2(*b*) is observed. FIG. 4 is a graph showing the relationship between the carbon content (denoted as x) of the Fe—C alloy target used in forming the film and the carbon content in the iron carbide film which is made. The values of the carbon content indicated in FIG. 3, namely x=0.79, 2, 3, 4, 6 (atomic %) are C contents included in the target which was used.

As is apparent from FIG. 3, only the diffraction line from the (002) plane of the α' phase, namely α' (002) is observed in the sample of iron carbide film which has been made. This diffraction line was observed within a range from 2 θ from 70 to 77', and no other diffraction lines were observed within a range from 2 θ from 20 to 115°. The diffraction line from α' (002) showed a tendency to shift towards lower angles as the carbon content in the film increased, the shift suggesting an increase of the (002) lattice spacing. This reflects the analytic result of ESCA (electron spectroscopy for chemical analysis) which an X-ray photoelectron spectral analysis techniques, shown in FIG. 4, namely the results showing an increase in the carbon content. While the graph of FIG. 2 shows the tendency for the carbon content in the produced iron carbide film (ordinate) to become greater than the carbon content of the target used in forming the film (abscissa), this disparity in the composition depends on the film forming conditions and does not have any effect on the crystal structure of α'—Fe—C film described above.

The above description of FIG. 3 and FIG. 4 deals with the sample S1 of the first embodiment, although similar results were confirmed also for the sample S2 of the second embodiment, namely a sample with a construction as the magnetic layer 11 comprising α'—Fe—C film was formed via the buffer layer 12 made of Fe on the substrate 10.

Figure 5:
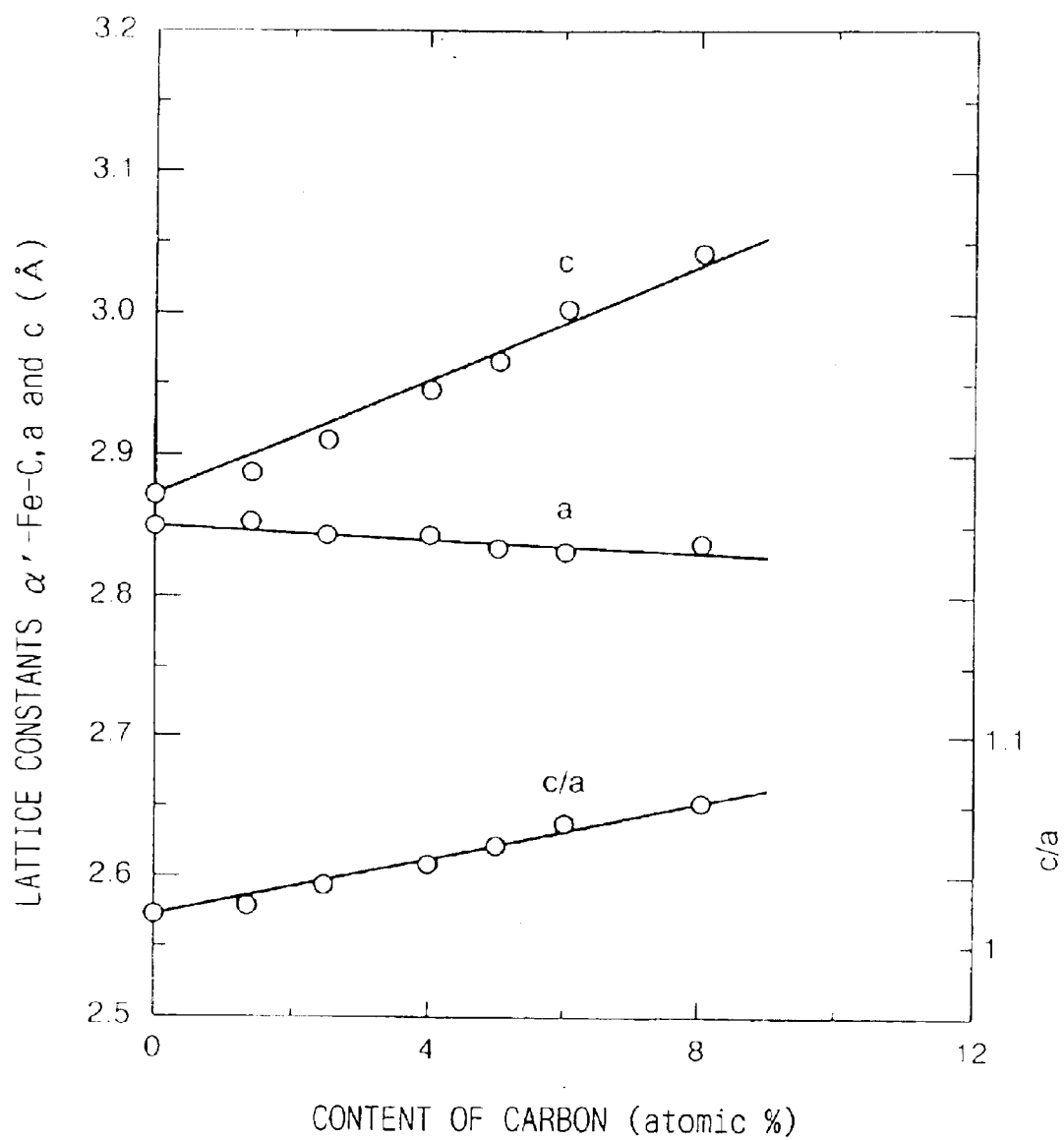
FIG. 5 is a graph showing plots of the lattice constants a and c of the iron carbide film measured by the Schulz reflection method and an axis ratio c/a determined from these numerical against versus the carbon content in the film.

FIG. 5 is a graph showing plots of the lattice constants a, c of the α'—Fe—C film measured by the Schulz reflection method and an axial ratio c/a determined from these constants vs. the carbon content in the film. FIG. 5 shows a tendency for the lattice constant c to increase as the carbon content increases. The lattice constant a, in contrast, decreases slightly as the carbon content increases, and maintains a substantially constant value of 2.83. Since the ratio c/a has a value of about 1.06, it becomes clear that the a α'—Fe—C film which was formed has a body centered tetragonal (bct) structure.

The above description of FIG. 5 dealt with the sample S1 of the first embodiment, although similar results were confirmed also for the sample S2 of the second embodiment, namely the sample with a construction in which the magnetic layer comprising an a α'—Fe—C film was formed via the Fe buffer layer on the substrate.

It was also found that the changes in the lattice constants with the carbon content in the a α'—Fe—C film described above have the same tendencies as the changes in the lattice constants with the nitrogen content in the Fe—N film of the α' phase known in the prior art.

Figure 6A:
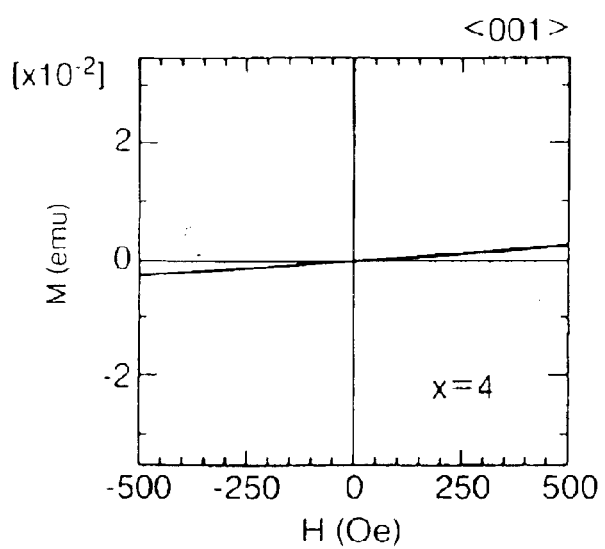
FIG. 6 is a hysteresis loop of an iron carbide film having a carbon content in the film of 4 atomic % among the sample S1 made in the first embodiment, in which (a) shows the results of the <001> direction of a bct structure, (b) shows the results of the <100> direction of a bct structure, and (c) shows the results of the <110> direction of a bct structure.
Figure 6B:
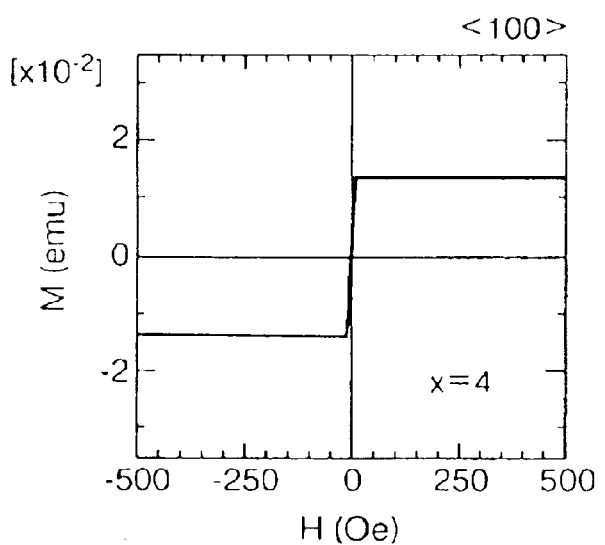
Figure 6C:
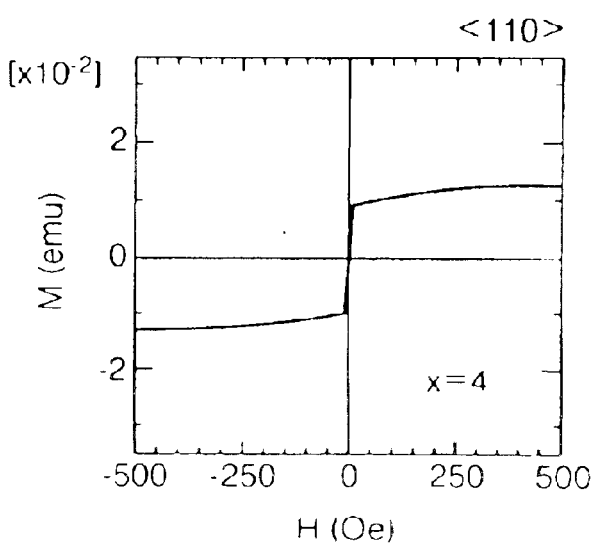

FIG. 6 shows a hysteresis loop of the α'—Fe—C film having carbon content of 4 atomic % in the film, among the samples S1 made in the first embodiment, in which (a) shows the results of the <001> direction of the bct structure, (b) shows the results of the <100> direction of the bct structure, and (c) shows the results of the <110> direction of the bct structure. A vibrating sample type magnetometer (VSM) was used in this measurement. FIG. 6(a) shows that the a α'—Fe—C film has an axis of hard magnetization along the c a-axisnd FIG. 6(b) and (c) show that the plane of easy magnetization is the c plane.

The energy required to cause magnetization in one direction is given by the following integrated value of the magnetization (hysteresis) curve represented by the following formula (1).

$$E = \int_0^{M_S} H dM \quad (1)$$

That is, the energy is given as the area enclosed by the magnetization curve and the axis y.

Figure 7:
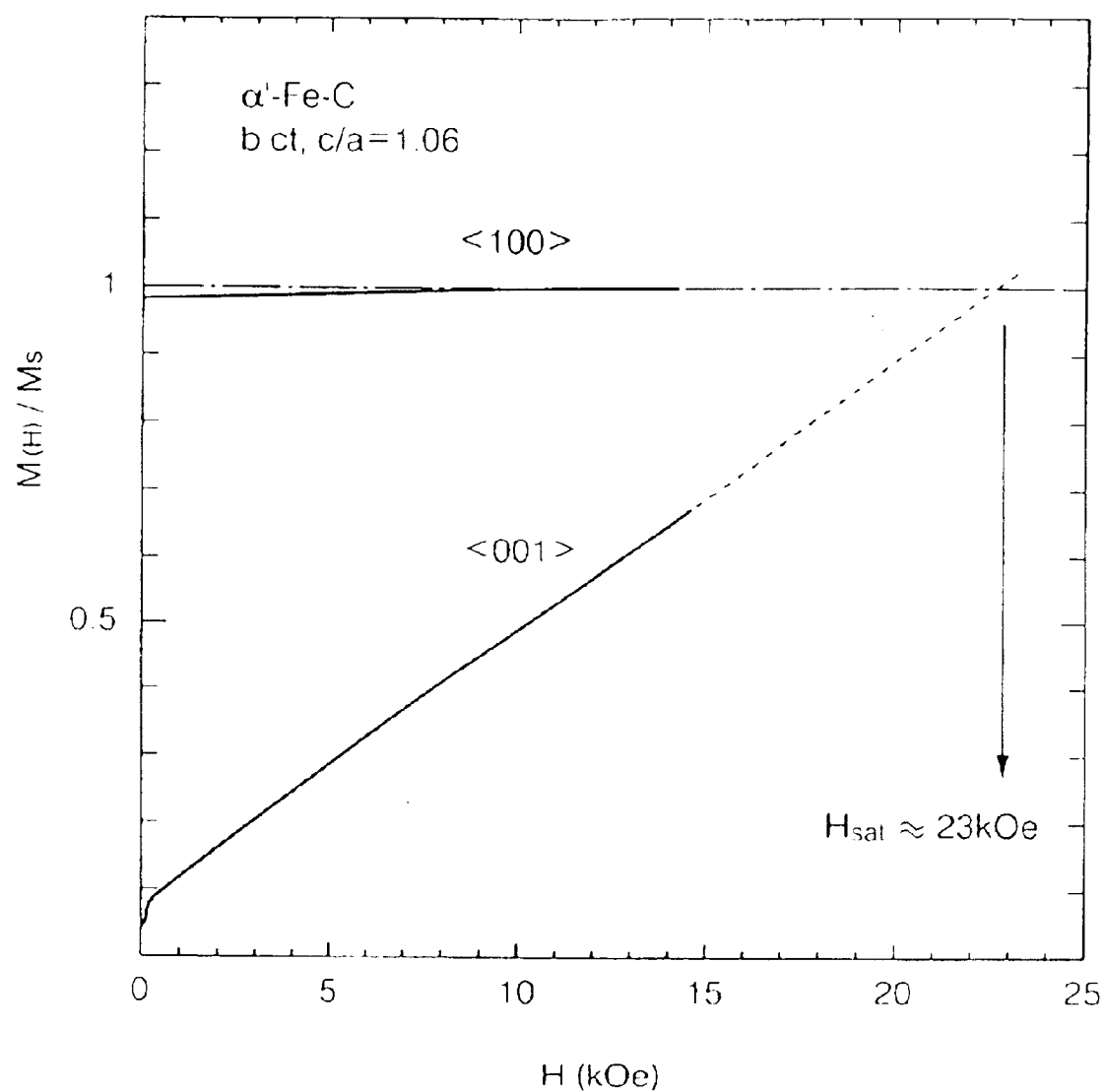
FIG. 7 is a hysteresis loop of an iron carbide film made in the first embodiment and shows the results of a case where magnetic field is applied in the <001> direction or the <100> direction of a bct structure.
Figure 8:
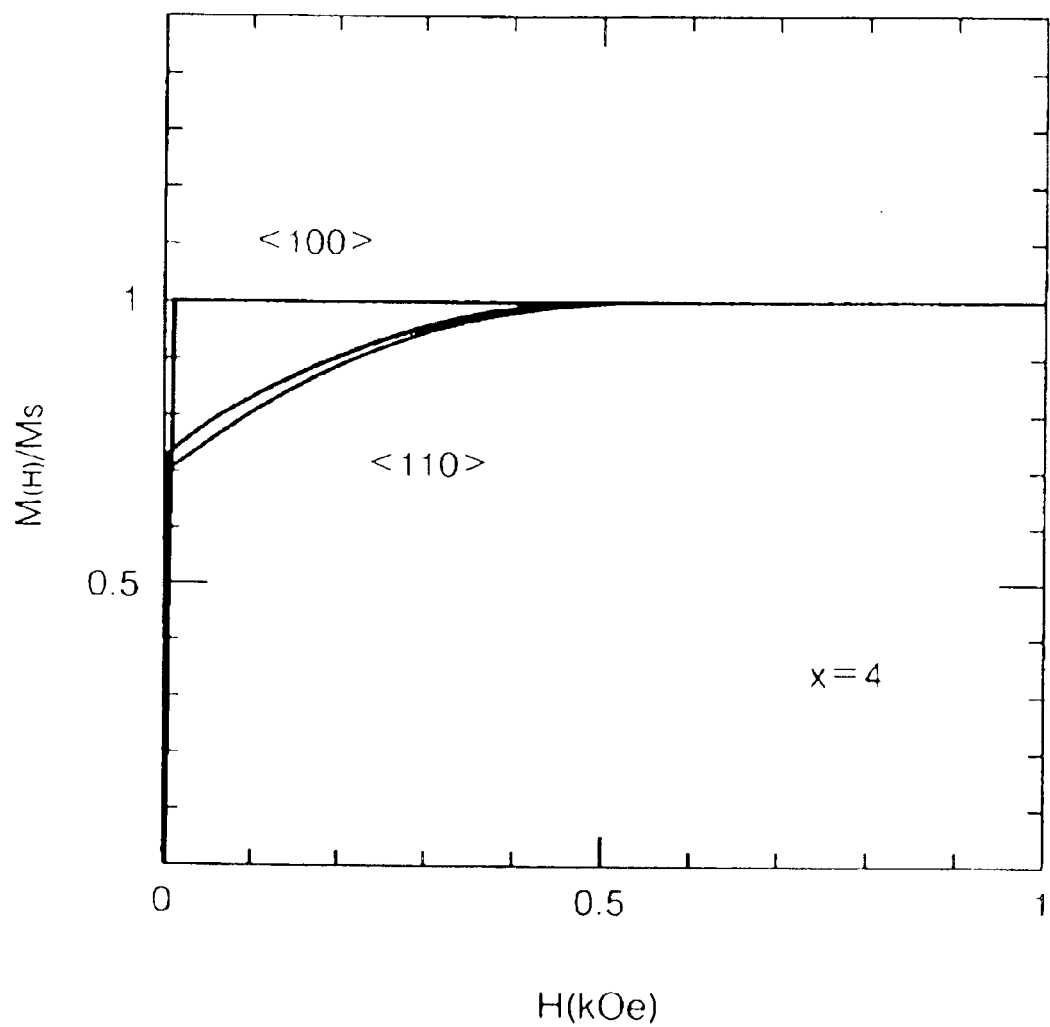
FIG. 8 is a hysteresis loop of an iron carbide film made in the first embodiment and shows the results of a case where magnetic field is applied in the <100> direction or the <110> direction of a bct structure.

Now the magnetization (hysteresis) curves of the α'—Fe—C film formed in the first embodiment shown in FIG. 7 and FIG. 8 will be described in detail below. FIG. 7 is a graph of a case where a magnetic field is applied in the <001> direction or <100> direction of the bct structure, and FIG. 8 is a graph of a case where magnetic field is applied in the <100> direction or <110> direction of the bct structure. The Applied magnetic field H is plotted along the abscissa and a normalized value of magnetization M (H) for the applied magnetic field H divided by the saturation magnetization Ms is plotted along the ordinate.

Therefore, in the case of the α'—Fe—C film of the present invention, the energy required to direct the magnetization from within the c plane to the direction of c axis is given by the area SA between the magnetization curves of cases where the magnetic field H is applied in the <001> direction and <100> direction (FIG. 7). FIG. 7 shows the result obtained without correcting for the demagnetization field. Heat (=23 kOe) in the graph is saturation field value which was estimated simply from the magnetization curve obtained from the applied magnetic fields up to 15 kOe.

Similarly, the energy required to rotate the magnetization in the c c-planean be determined from the area SB enclosed by the magnetization curves of cases where the magnetic field H is applied in the <100> direction and <110> direction (FIG. 8).

Ratio of the areas is simply the energy ratio.

According to FIG. 7, when a correction for the demagnetization field (approx. 21 kOe) is applied to the saturation field $H_{sat}$ estimated as described above, the magnetic field at which the magnetization curve in <001> direction is saturated is determined as about 2 kOe. Then assuming that the saturation magnetization of the α'—Fe—C film is 1700 emu/cm³, substantially equal to that of Fe, then the energy required to direct the magnetization from within the c plane to the direction of the c axis, namely the area SA, is calculated as 1/2*1700*2000. The symbol * represents a multiplication operation.

Meanwhile FIG. 8 shows that the magnetization increases rapidly up to a point around M(H)/Ms=0.75 in the magnetization curves in the <110> direction, followed by a gradual increase, and is saturated at near 400 Oe. In the magnetization curves in the <100> direction, on the other hand, saturation is reached with a weak magnetic field of several Oe. Thus the energy required to rotate the magnetization in the c plane, namely the area SB, is calculated as 1/2*1700* (1−0.75)*400.

The ratio of the two areas is calculated as follows.

$$SA:SB = (1/2*1700*2000):(1/2*1700*(1-0.75)*400) \quad (2)$$
$$= 100:5$$

It can be seen that SA is about two orders of magnitude larger than SB.

In other words, it is made clear from the results shown in FIG. 7 that the magnetic anisotropy energy required for the direction of spontaneous magnetization to change from the c plane to the c axis direction of the α'—Fe—C film is two orders of magnitude greater than the magnetic anisotropy energy required for the direction of spontaneous magnetization to change from the axis of easy magnetization within the c-plane. Moreover, it was confirmed that the α'—Fe—C film has an axis of hard magnetization having a direction substantially perpendicular to the film surface and the plane of easy magnetization having a direction substantially parallel to the film surface.

This tendency persisted in the α'—Fe—C films having carbon contents within a range from 0 to 20 atomic %. Similar results to that of the sample S1 of the first embodiment described above were confirmed also in the sample S2 of the second embodiment, namely the sample with a constitution with a magnetic layer comprising an a α'—Fe—C film formed via an Fe buffer layer on the substrate.

Figure 9:
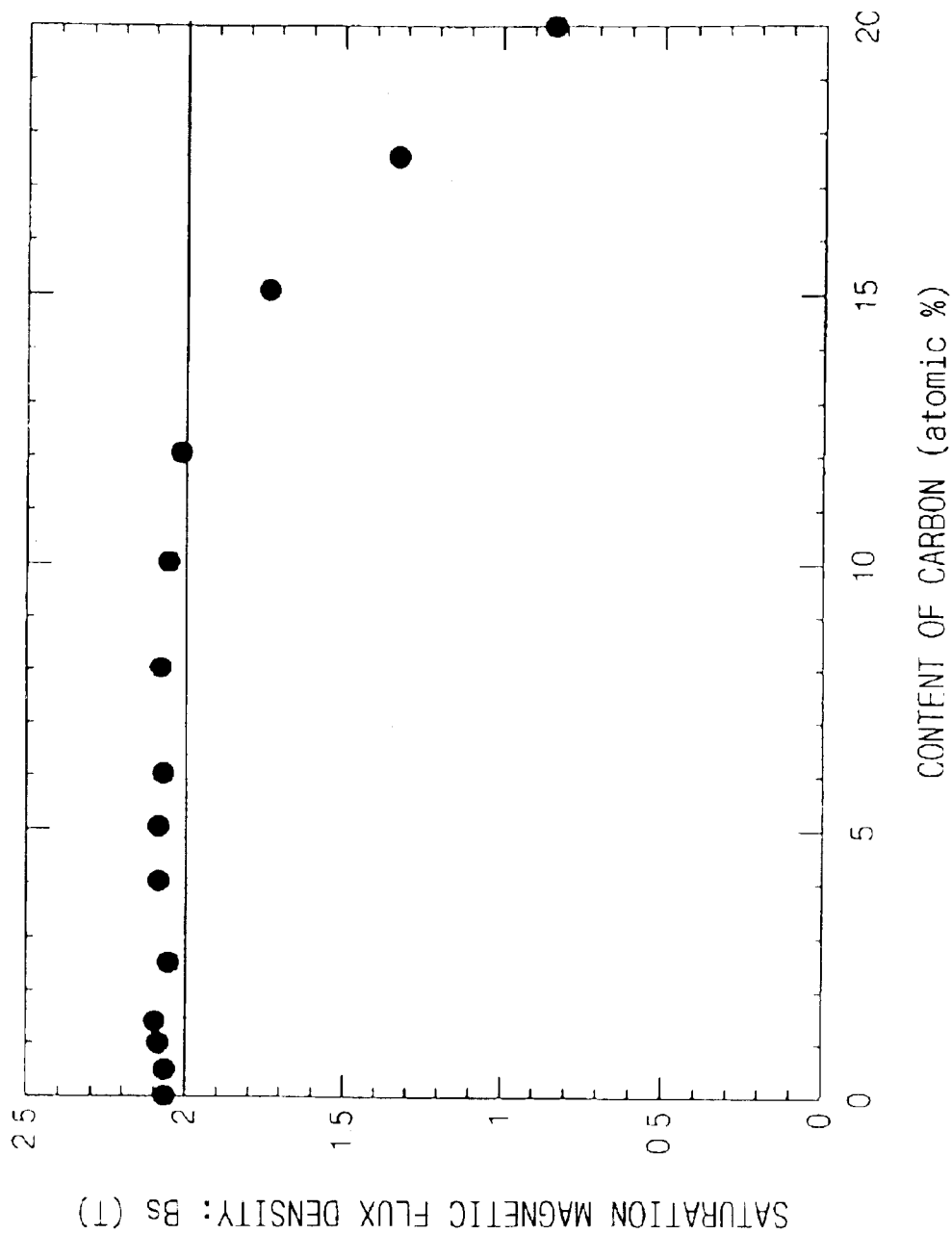
FIG. 9 is a graph showing the relationship between the carbon content of a sample S1 made in the first embodiment and the saturation magnetic flux density Bs.

FIG. 9 is a graph showing the relationship between the carbon content and the saturation magnetic flux density Bs of the sample S1 made in the first embodiment. As is apparent from the graph, α'—Fe—C films having a carbon content of 15 atomic % are capable of achieving a saturation magnetic flux density which surpasses the saturation magnetic flux density 1.5 T of the magnetic material used in heads at present. It was also found that a stable saturation magnetic flux density exceeding 2 T can be achieved by setting the carbon content of the α'—Fe—C film to 12 atomic % or less.

Figure 10:
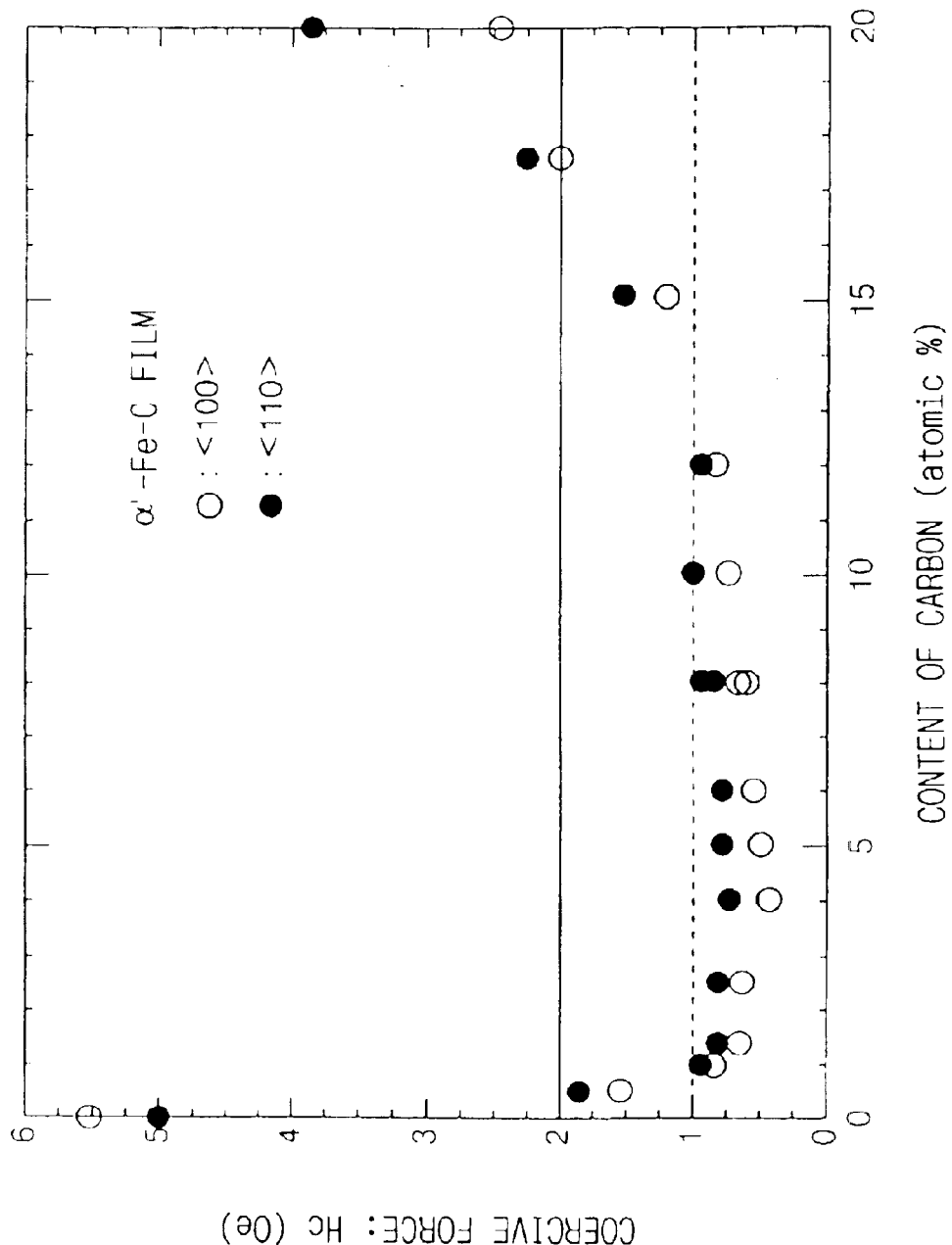
FIG. 10 is a graph showing the relationship between the carbon content of a sample S1 made in the first embodiment and the coercive force Hc.

FIG. 10 is a graph showing the relationship between the carbon content and the coercive force Hc of the sample S1 made in the first embodiment. In FIG. 10, the symbol ○ is a plot for the <100> direction and the symbol ● is a plot for the <110> direction. While a carbon-free iron film (0 on the abscissa) has a coercive force of 5 Oe or higher, the coercive force decreases significantly to 2 Oe or less when a trace of carbon as small as 0.5 atomic % is added to the iron. As the carbon content is increased to 1 atomic % or more, an excellent film having low coercive force of 1 Oe or less is obtained. This tendency persists till the carbon content reaches 12 atomic %. The coercive force can be maintained at 2 Oe or less as long as the value of the carbon content is within about 15 atomic %.

The results described above show that the iron carbide film of the present invention has soft magnetic properties with a saturation magnetic flux density exceeding 1.5 T and a coercive force within 2 Oe when the film contains carbon within a range from 0.5 atomic % to 15 atomic % inclusive with the rest being iron. When the film contains carbon within a range from 1 atomic % to 12 atomic %, a saturation magnetic flux density of 2 T or more and a coercive force of 1 Oe or less can be achieved, which are more preferable.

The above description refers to the sample S1 of the first embodiment, namely the sample made by forming the iron carbide film directly on the substrate, although similar results were obtained also on the sample S2 of the second embodiment, namely the sample with a constitution in which the iron carbide film was formed via the iron buffer layer on the substrate. However, the iron film provided on the substrate of the sample S2 is a thin film of which the surface lies in the (200) plane, and the various magnetic properties described above can be obtained more stably by depositing iron carbide on this iron film, and therefore the layer structure of the sample S2 is more preferable than that of the sample S1.

When an appropriate amount of cobalt is added as a third ¢ element to the iron carbide film of the present invention, the saturation magnetic flux density can be increased by about 10% over that of an iron carbide film which does not include cobalt. For example, a magnetic film with a composition of Fe-30 at % Co-4 at % C has a saturation magnetic flux density which is 1.12 times higher than that of a magnetic film with a composition of Fe-4 at % C. Thus the saturation magnetic flux density of the iron carbide film of the present invention can be increased further by adding an appropriate amount of cobalt.

(Embodiment 3)

This embodiment is different from the first embodiment in that a mixed gas of (Ar+$N_2$) is used instead of the Ar gas for the process gas when forming the magnetic film made of Fe-4 at % C by sputtering. Iron carbide films (referred to as sample S3) of different nitrogen contents were formed by changing the ratio of $N_2$ gas to Ar gas.

Table 3 shows the nitrogen content and the magnetostriction of the magnetic film made in this embodiment. Manetostriction is measured by the cantilever method, with $\lambda''$ indicating the value in the parallel direction and $\lambda\perp$ indicating the value in the direction perpendicular to the film surface. The figures shown in Table 3 are values of $\lambda''$ minus $\lambda\perp$.

TABLE 3

| Nitrogen content [atomic %] | $\lambda'' - \lambda\perp$ [×10$^{-6}$] |
| --- | --- |
| 0 | −4.1 |
| 2 | −4.5 |
| 4 | −1.3 |
| 6 | −0.6 |
| 7 | +0.4 |
| 8 | +1.4 |
| 10 | +2.3 |

The following points become apparent from Table 3.

①A nitrogen-free iron carbide film has a negative value of magnetostriction in the order of $10^{-6}$.

② The value of magnetostriction changes in sign from negative to positive as the nitrogen content in the film increases.

③ If nitrogen is added to a magnetic film made of Fe-4 at % C, the value of the magnetostriction decreases by one order of magnitude when the nitrogen content is about 6–7 atomic %, and a magnetic film having a magnetostriction on the order of $10^{-7}$ can be obtained.

From the results described above, it was confirmed that a thin film having a very small value of magnetostriction at a level on the order of $10^{-7}$ can be made from the iron carbide of the present invention by adding an appropriate amount of nitrogen. However, a nitrogen content in the film which decreases the value of the magnetostriction to such a low level varies depending on the carbon content in the iron carbide, and is not necessarily limited in the range from 6 to 7 atomic %.

(Embodiment 4)

This embodiment is different from the first embodiment in that a mixed gas of (Ar$^+$ $N_2$) is used instead of Ar gas as the process gas when forming the magnetic layer 11 with a layer composition consisting of 0 to 20 atomic % of carbon (C) and iron (Fe) as the balance by directly deposition on the substrate 10 by sputtering using the sputtering device shown in FIG. 12.

Iron carbide films (referred to as sample S4) of different nitrogen contents were formed by changing the ratio of $N_2$ gas to Ar gas.

Figure 16:
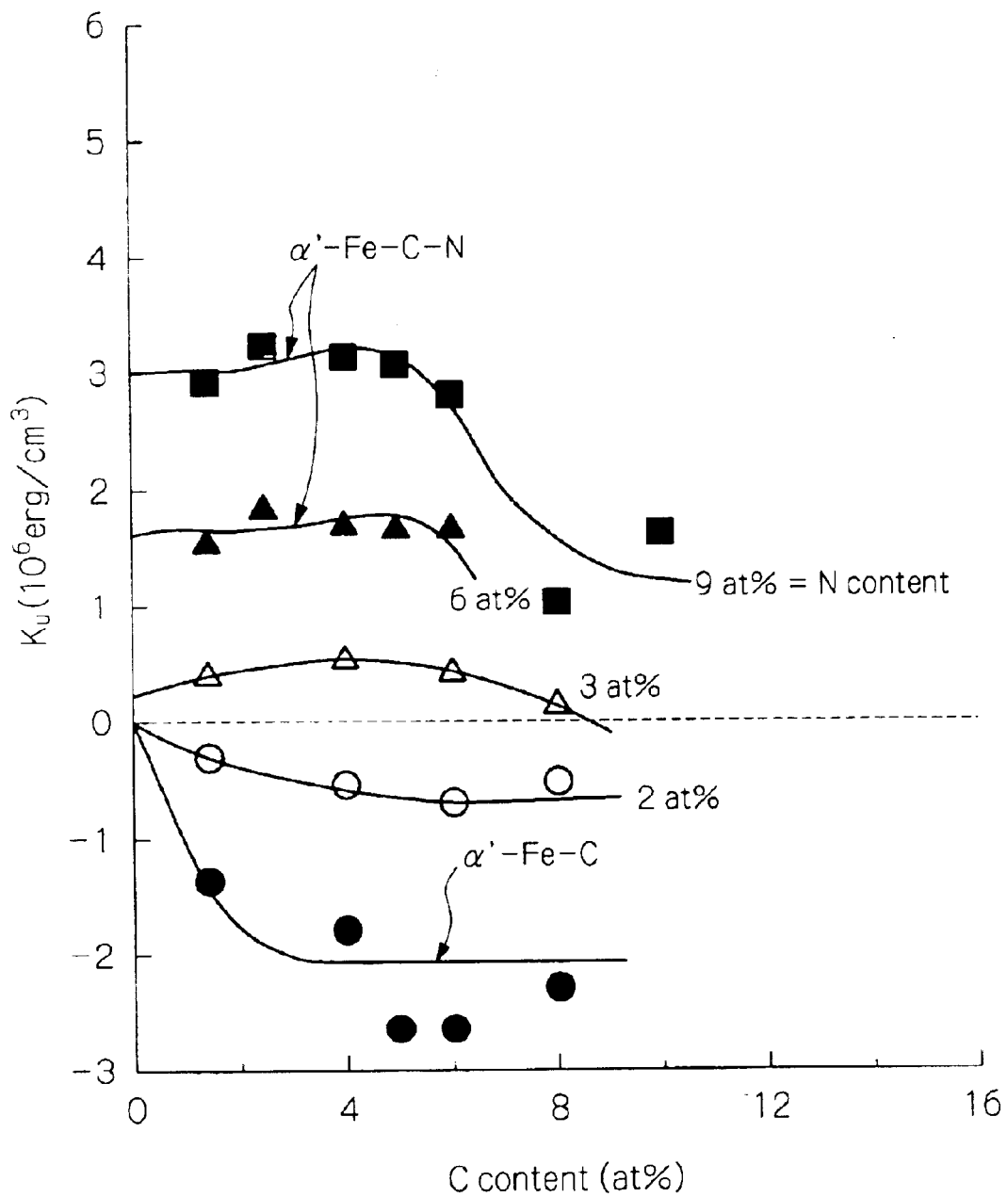
FIG. 16 is a graph showing the results of the relationship between the C content and the uniaxial magnetocrystalline anisotropy constants Ku with the change of the amount of nitrogen to be incorporated into an iron carbide film.

FIG. 16 is a graph showing the relationship between the C content and the magnetic anisotropy energy Ku when the nitrogen content in the α'—Fe—C film. In FIG. 16, the symbol ● is a plot for a case where the N content is zero (denoted as α'—Fe—C), the symbol ○ is a plot for a case where the N content is 2 atomic %, the symbol Δ is a plot for the case where the N content is 3 atomic %, the symbol ▲ is a plot for a case where the N content is 6 atomic % and the symbol ■ is a plot for a case where the N content is 9 atomic %.

The following points become apparent from FIG. 16.

(1) Camparing α'—Fe—C films having the same C content (for example 4 atomic %), the value of the magnetocrystalline anisotropy constant Ku shifts from negative to positive as the N content in the film increases.

(2) The value of Ku can be made one order of magnitude smaller by adding an appropriate amount of nitrogen to the α'—Fe—C film (C content within a range from 0 to 8 atomic %). Specifically, an iron nitride-C film (referred to as α'—Fe—C—N film) with a value restrained to on the order of $10^5$ (erg/cm$^3$) can be obtained by controlling the N content within a range from 2 to 3 atomic %.

As is apparent from the results of the third embodiment and the fourth embodiment, the magnetostriction and magnetocrystalline anisotropy constant of the α'—Fe—C film of the present invention can be controlled by adjusting the N content thereof. The results of this experiment also suggest that a thin magnetic film having a value of magnetostriction on the order of $10^7$ and a value of magnetocrystalline anisotropy constant on the order of $10^5$ (erg/cm$^3$) can be formed by optimizing the C content and N content.

(Embodiment 5)

This embodiment is different from the second embodiment in that the temperature of the substrate where an iron buffer layer was formed was changed within a range from 0 to 200° C. when forming the magnetic film made of Fe-4 at % C by sputtering. The substrate temperature was fixed at 200° C. during the process of forming the iron buffer layer. Sample S5 having such a layer structure as shown in FIG. 1(b) was made similarly to the second embodiment in other aspects, except for the differences described above.

As mentioned in conjunction with the results of the first embodiment, the iron carbide film of the present invention can be specified when only the diffraction line from the (002) plane is observed.

Figure 11:
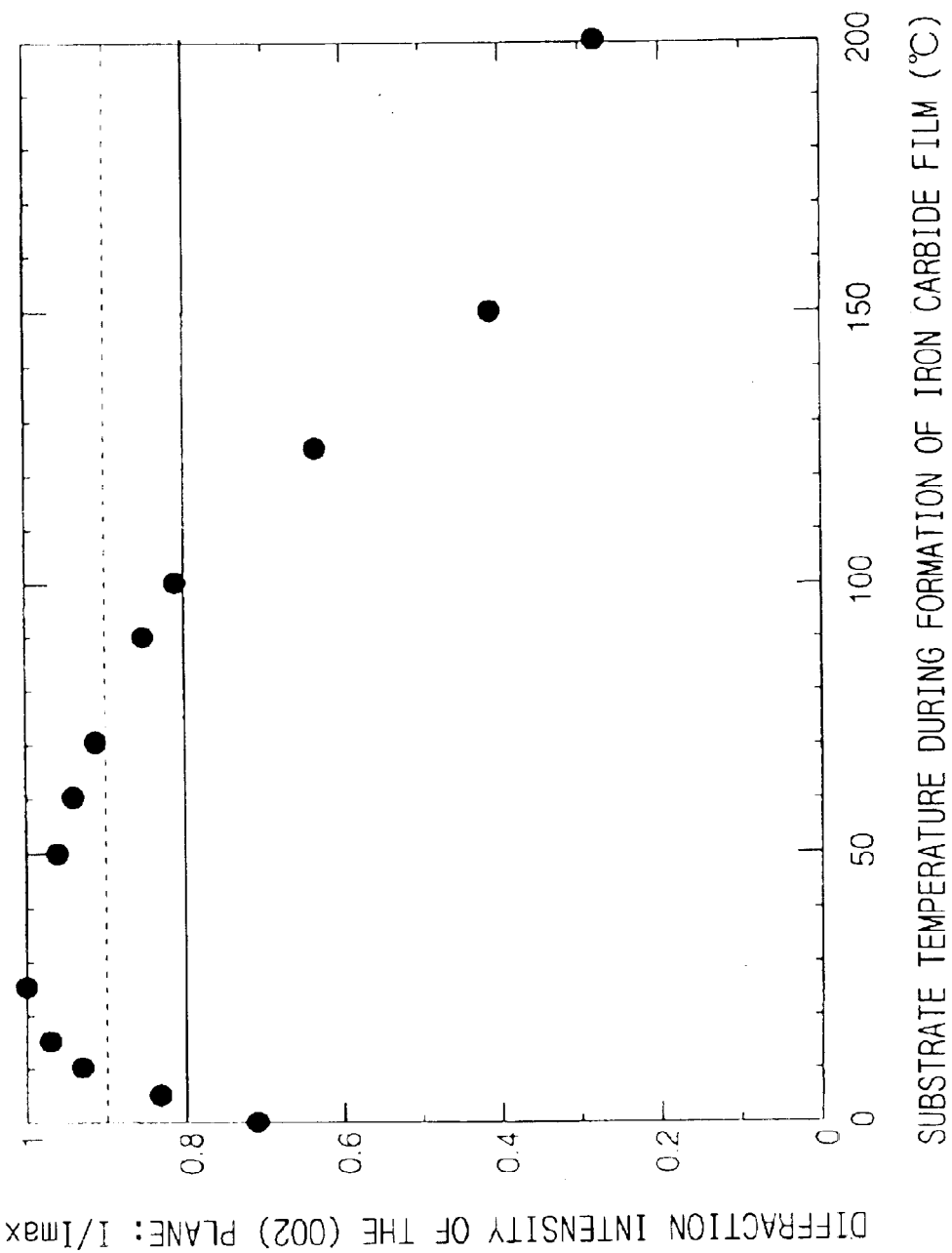
FIG. 11 is a graph showing the relationship between the substrate temperature when an iron carbide film is made in the fourth embodiment and the X-ray diffraction intensity of the (002) plane of the resulting iron carbide film.

FIG. 11 is a graph showing the relationship between the substrate temperature when forming an iron carbide film and the X-ray diffraction intensity from the (002) plane of the iron carbide film which was obtained. The X-ray diffraction intensity plotted along the ordinate is the intensity I of the diffraction line from the (002) plane of the iron carbide film which was formed at a particular substrate temperature divided by the maximum intensity Imax of the diffraction line from the (002) plane which was achieved when the substrate temperature was 25%.

As is apparent from FIG. 11, when the substrate temperature is within a range from 5° C. to 100° C., an X-ray diffraction intensity not less than 80% of Imax is observed and consequently the desired a α'—Fe—C film can be made under a substantially stable conditions. When the substrate temperature is within a range from 125° C. to 200° C., on the other hand, the intensity of the diffraction line from the (002) plane decreases rapidly as the temperature rises, and therefore the iron carbide film which is formed is considered to depart from the desired crystal structure. When the substrate temperature is within a range from 10° C. to 70° C., the X-ray diffraction intensity becomes 90% of Imax or greater and consequently the desired α'—Fe—C film can be made under more stable conditions, which is more preferable.

(Embodiment 6)

In this embodiment, a recording/reproduction separation type magnetic head 50 for an HDD was made by using a thin magnetic film made of the iron carbide shown in the first embodiment as the upper magnetic pole and the lower magnetic pole., FIG. 13 is a partially cross-sectioned perspective view showing an example of the structure of the magnetic head 50 according to this embodiment. In FIG. 13, the reference symbol 51 denotes a magnetoresistive element, 52 denotes a lower shield layer, 53 denotes a lower magnetic pole which also serves as an upper shield layer, 54 denotes a coil, 56 denotes a substrate, 57 denotes an electrode, 58 denotes a read head, and 59 denotes a recording head.

In the magnetic head 50 shown in FIG. 13, the section where the magnetoresistive element 51 is interposed between the lower shield layer 52 and the upper shield layer 53 constitutes the read head 58. The upper shield layer 53 also serves as the lower magnetic pole 53 of the recording head, while the section where the coil 54 is interposed between the lower magnetic pole 53 and the upper magnetic pole 55 constitutes the recording head 59.

The iron carbide film formed by sputtering according to the present invention, for example an α'—Fe—C film with a composition of Fe-4 at % C is disposed on the upper magnetic pole 55 and the lower magnetic pole 53 which constitute the recording head 59. An iron buffer layer (not shown) may also be formed under the iron carbide film for the purpose of obtaining soft magnetic properties of the iron carbide film under stable conditions. The iron carbide film may also include cobalt which increases the saturation magnetization and nitrogen which restrains the magnetostriction to the order of $10^{-7}$.

The substrate 56 is made of alumina-titanium carbide, and functions as a slider for the magnetic head 50. The lower shield layer 52 is made of a permalloy (Fe-80 wt % Ni alloy) film formed by sputtering on a surface coating by a covering layer (not shown) made of alumina.

For the magnetoresistive element 51, a laminate (not shown) made by laminating a free layer consisting of a permalloy film, a conductive layer consisting of a copper film, a pin layer consisting of a permalloy film and a antiferromagnetic layer consisting of iridium-manganese film is used.

The copper film is used for the electrode 57 of the magnetoresistive element 51 constituting the read head 58 and the coil 54 constituting the recording head 59.

Although not shown in the drawing, insulation films made of alumina by sputtering are used for the gap members between the layers, and a covering layer made of alumina similarly by sputtering is provided on the upper magnetic pole 55.

In the magnetic head 50 constituted as described above, since the iron carbide films having high saturation magnetic flux density exceeding 2 T are used in all or a portion of the upper magnetic pole 55 and the lower magnetic pole 53, a magnetic field having strong intensity and high gradient can be generated without overly saturating these magnetic films, thus making it possible to increase the linear recording density. The magnetic pole material comprising the iron carbide films having high saturation magnetization exceeding 2 T also contributes to the increase in the track density. That is, while smaller track width W of the recording head 59 shown in FIG. 13 causes the intensity of magnetic field leaking from the recording head to decrease, leakage magnetic field intensity can be maintained at a high level when the saturation magnetic flux density of the magnetic pole material is high. Consequently, the recording head which employs the thin magnetic film made of the iron carbide according to the present invention as the magnetic pole material is also capable of decreasing the track width more than that of the prior art.

Further, in order to achieve a high linear recording density, it is necessary to decrease the gap g shown in FIG. 13. For this purpose, it is important to form the upper magnetic pole 55 firmly on the insulation film (not shown) which is provided on the lower magnetic pole 53 and is made thinner. Since the thin magnetic film made of the iron carbide according to the present invention can be formed stably by a sputtering process which is excellent in bonding performance and dense construction of the film which is formed thereby, the thin magnetic film is a suitable magnetic pole material for forming a thin film which enables it to decrease the gap.

Thus the recording head 50 which employs the thin magnetic film made of the iron carbide according to the present invention as the magnetic pole material of the recording head is capable of writing magnetic signals with low noise and high resolution onto a magnetic recording medium which has higher coercive force than the prior art, and therefore achieves even higher longitudinal recording density.

In the prior art, recording heads made of magnetic pole materials having a saturation magnetic flux density within a range from about 1.5 to 1.8 T are capable of writing in a medium which has a coercive force of about 2500 Oe or less, although it has been difficult to write satisfactorily in a medium which has higher coercive force. In contrast, the recording head 50 which has the recording head 59 which employs the iron carbide film according to the present invention having saturation magnetic flux density exceeding 2 T as the magnetic pole material was proved to have sufficient capability to write in a medium which has a coercive force of 2500 Oe or higher.

(Embodiment 7)

In this embodiment, a hard disk drive (HDD) 70 shown in FIG. 14 and FIG. 15 will be described as an example of a magnetic recording device which is provided with the magnetic head which uses the iron carbide film according to the present invention described in the sixth embodiment as the magnetic pole.

Figure 14:
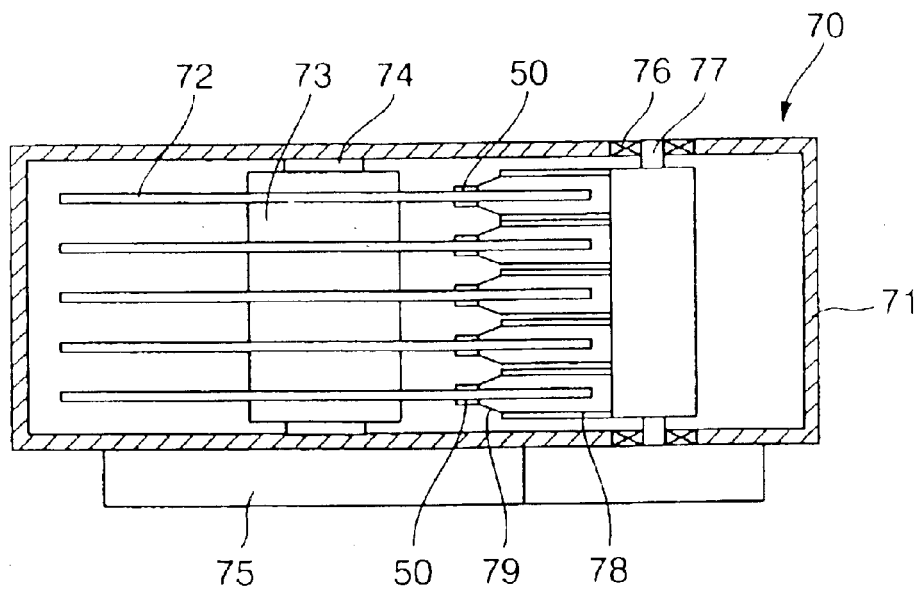
FIG. 14 is a side cross-sectional view showing an example of a magnetic recording device according to the present invention.
Figure 15:
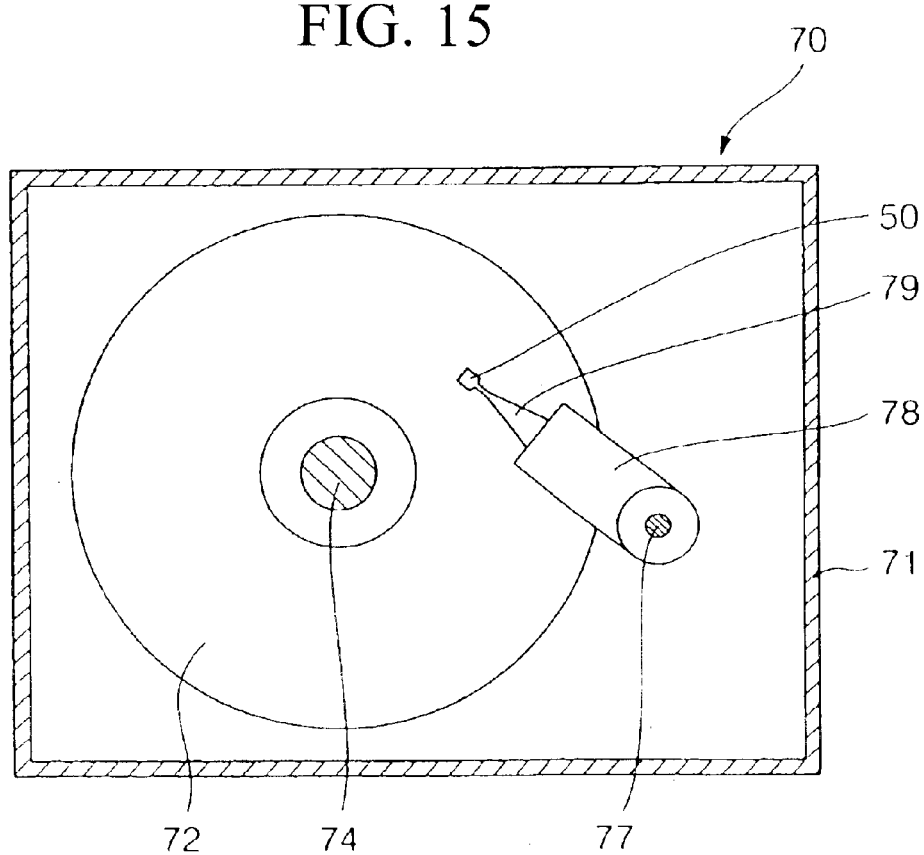
FIG. 15 is a plan cross-sectional view showing the magnetic recording device shown in FIG. 14.

FIG. 14 is a side cross-sectional view showing an example of the magnetic recording device according to the present invention. FIG. 15 is a plan cross-sectional view showing an example of the magnetic recording device shown in FIG. 14. In FIG. 14 and FIG. 15, the reference symbol 50 denotes a magnetic head, 70 denotes a hard disk drive, 71 denotes a chassis, 72 denotes a magnetic recording medium, 73 denotes a spacer, 74 denotes a spindle, 75 denotes a motor, 76 denotes a bearing, 77 denotes a rotary shaft, 78 denotes a swing arm, and 79 denotes a suspension.

The HDD 70 according to the present invention has the recording/reproduction separation type magnetic head 50 wherein the iron carbide film shown in the fifth embodiment is used for the upper magnetic pole 55 and the lower magnetic pole 53 of the recording head 59.

The HDD 70 of this embodiment has the exterior defined by the chassis 71 of rectangular parallelepiped shape which has an inner space for housing the disk-shaped magnetic recording medium (HD, hard disk) 72, the magnetic head 50, etc., while plural magnetic recording media 72 are disposed alternately with the spacer 73 on the spindle 74 which penetrates therethrough in the chassis 71. A bearing (not shown) of the spindle 74 is installed in the chassis 71, and the motor 75 is disposed outside of the chassis 71 for rotating the spindle 74. In this construction, all of the magnetic recording media 72 are stacked one on another with spaces in between maintained by the spacers 73 for accommodating the magnetic head 50, to be freely rotatable around the spindle 74.

Disposed in the chassis 71 to the side of the magnetic recording media 72 is the rotary shaft 77 called rotary actuator which is supported in parallel to the spindle 74 by the bearing 76. Mounted on the rotary shaft 77 are plural swing arms 78 extending into the spaces between the magnetic recording media 72. Attached to the tip of each of the swing arms 78 via the suspension 79 is the magnetic head 50 which is a narrow triangular plate and is fastened in a direction inclined toward the surface of the magnetic recording medium 72 located on or under the same.

The magnetic head 50 is a recording/reproduction separation type magnetic head 50 which integrates the write-only recording head 59 having an inductive element made of the iron carbide film of the present invention as the magnetic pole material, and the read-only read head 58 which has the magnetoresistive element 51, the head being mounted on one side of the slider opposite to the surface of the magnetic recording medium 72. The slider which has the magnetic head 50 is elastically supported, on the side thereof opposite to the side facing the surface of the magnetic recording medium 72, by a gimbal member provided on the tip of the suspension 79.

In the construction described above, since the magnetic head 50 can be moved in the radial direction of the magnetic recording medium 72 by the movement of the swing arm 78 while rotating the magnetic recording media 72, the magnetic head 50 can be moved to any position on the magnetic recording medium 72.

In the hard disk drive 70 of the construction described above, the magnetic head 50 is moved to any position on the magnetic recording medium 72 by moving the swing arm 78 while rotating the magnetic recording medium 72 and the magnetic field generated by the recording head 59 constituting the magnetic head 50 is applied to the magnetic recording layer (not shown) which constitutes the magnetic recording medium 72, thereby making it possible to write the desired magnetic information in the magnetic recording medium 72. Also the magnetic information can be read by moving the magnetic head 50 to any position on the magnetic recording medium 72 by moving the swing arm 78, and sensing the leakage magnetic field from the magnetic recording layer (not shown) constituting the magnetic recording medium 72 by means of the read head 58 constituting the magnetic head 50.

When reading and writing the magnetic information as described above, in case the upper magnetic pole 55 and the lower magnetic pole 53 of the recording head 59 constituting the magnetic head 50 are made of an $\alpha'$—Fe—C film having excellent soft magnetic properties as described previously, it is made possible to carry out a sufficiently stable writing operation even in a magnetic recording medium 72 having a high enough coercive force that it would be unsaturated when written on by means of a magnetic head of the prior art.

The fact that the magnetic recording medium 72 having a high coercive force can be used means that the leakage magnetic field received by the reading element of the read head 58, namely received by the magnetoresistive element 51 can be increased during levitated running of the magnetic head. That is, since the read head 58 constituting the magnetic head of the present invention can receive a signal which is stronger than that of the prior art from the magnetic recording medium 72, the hard disk drive 70 of this embodiment can achieve recording and reproduction characteristics with a high S/N ratio.

Moreover, since the iron carbide film of the present invention has a saturation magnetic flux density higher than 2 T, the track width can be made narrower than that of the prior art and the film can be formed by sputtering, thereby making it possible to decrease the gap. As a result, the magnetic recording device 70 which is capable of writing magnetic information in the magnetic recording medium 72 by using the recording head 59 which employs the iron carbide film of the present invention as the magnetic pole is capable of achieving a higher recording density than a conventional device.

The embodiments described above deal with cases of using the longitudinal magnetic recording medium which has the axis of easy magnetization directed in parallel to the substrate as the moving magnetic recording medium. However, the operation and effects described above which are realized by employing the iron carbide film of the present invention as the magnetic pole material of the recording head can be similarly substantially achieved in the case of a perpendicular magnetic recording medium which has the axis of easy magnetization in the direction perpendicular to the substrate. Therefore, the hard disk drive 70 as an example of the magnetic recording device of the present invention may be a longitudinal recording device having longitudinal recording medium mounted thereon as the magnetic recording medium 72 or a perpendicular magnetic recording device having a perpendicular magnetic recording medium mounted thereon as the magnetic recording medium 72.

Moreover, since the hard disk drive 70 described previously with reference to FIG. 14 and FIG. 15 is an example of the magnetic recording device, the number of magnetic recording media mounted on the magnetic recording device may be any number, one or over. Also it goes without saying that the configuration of the swing arm 78 and the method for driving the same are not limited to those shown in the drawing, and other methods such as a linear drive method may be employed.

INDUSTRIAL APPLICABILITY

According to the present invention, as described above, by using the iron carbide consisting of an $\alpha'$ phase as a principal phase which is the particular crystalline form described above, it is possible to obtain a thin magnetic film which has magnetic properties which can accommodate increases of the recording density, namely, having satisfactory soft magnetic properties combining a saturation magnetic flux density of 2 T or more and a coercive force of 2 Oe or less.

By using the iron carbide consisting of an α' phase as a principal phase which is a specific crystalline form described above, it is possible to provide a method of producing the thin magnetic film which stably achieves the excellent soft magnetic properties described above, even in a film forming process wherein heat treatment is hardly carried out during and after forming the film.

Since a magnetic field having a stronger intensity and higher gradient than the prior art can be generated with the magnetic head which employs the iron carbide film which has the excellent soft magnetic properties described above for the upper magnetic pole and the lower magnetic pole, the linear recording density can be increased. Also because the intensity of the leakage magnetic field can be maintained at a high level due to the high saturation magnetic flux density of the iron carbide film which makes the magnetic pole, the magnetic head which employs the iron carbide film of the present invention is capable of contributing also to the reduction in the track width.

Also when the magnetic recording device has a magnetic head which employs the iron carbide film which has the excellent soft magnetic properties described above, both the linear recording density and the track density can be increased by combining a magnetic recording medium having a high coercive force, which has not allowed sufficient writing of a magnetic signal in the prior art, and also a recording and reproduction system having a high S/N ratio can be built and therefore it is possible to provide a magnetic recording device having a large storage capacity and excellent recording and reproduction characteristics.

The magnetic head which employs the iron carbide film of the present invention as the magnetic pole material is not limited to the constitution of the longitudinal magnetic recording medium and may employ a constitution of a perpendicular magnetic recording medium.

Also it is possible to provide a medium which can accommodate increases of the recording density, by using the thin magnetic film comprising the iron carbide film of the present invention on top of the recording layer consisting of the hard magnetic film constituting the longitudinal magnetic recording medium or under the recording layer consisting of the hard magnetic film constituting the perpendicular magnetic recording medium.

Further, by using the thin magnetic film comprising the iron carbide film of the present invention at least in a portion of the construction thereof, various magnetic devices having better characteristics than those of the prior art, for example, in terms of the energy product, frequency or current density, can be provided, such as exchange-spring magnets, spin transistor magnets, magnetic field sensors, high frequency passive devices, micro transformers and micro inductors.

What is claimed is:

1. A magnetic thin film consisting of an iron carbide film, said iron carbide film comprising an α' phase as a principal phase and at least carbon and iron as constituent elements,
    wherein said iron carbide film has a body-centered tetragonal structure and a c-axis constitutes an axis of hard magnetization and a c-plane constitutes a plane of easy magnetization, and
    wherein the α' phase is a martensite phase, and
    wherein said axis of hard magnetization constitutes a direction which is perpendicular to the film surface and said plane of easy magnetization constitutes a direction, which is horizontal to the film surface.

2. A magnetic thin film according to claim 1, wherein said iron carbide film consists of a single α' phase.

3. A magnetic thin film according to claim 1, wherein a diffraction peak from the (002) plane of the α' phase is observed as a principal peak by means of an X-ray diffraction method or an electron diffraction method in said iron carbide film.

4. A magnetic thin film according to claim 1, wherein said iron carbide film has a magnetic anisotropy energy required when the spontaneous magnetization deflects toward the direction of the c-axis from the c-plane, which is two orders of magnitude larger than the magnetic anisotropy energy required when spontaneous magnetization deviates from the direction of the axis of easy magnetization in the c-plane.

5. A magnetic thin film according to claim 1, wherein said iron carbide film consists of not less than 0.5 atomic % and not more than 15 atomic % of carbon and iron as the balance.

6. A magnetic thin film according to claim 1, wherein said iron carbide film consists of not less than 1 atomic % and not more than 12 atomic % of carbon and iron as the balance.

7. A magnetic thin film according to claim 1, wherein said iron carbide film contains cobalt as a third element.

8. A magnetic thin film according to claim 1, wherein said iron carbide film contains nitrogen as a third element.

9. A magnetic thin film according to claim 1, wherein said iron carbide film is formed on a surface of a thin film having an interatomic distance that is within 4 Å±10% of said iron carbide film.

10. A magnetic thin film according to claim 9, wherein the principal element constituting said thin film has lattice constants that are within 4 Å±10% of those of said iron carbide film.

11. A magnetic thin film according to claim 9, which is an iron film having the (200) plane as the surface.

12. A magnetic thin film according to claim 9, wherein the principal element constituting said thin film is at least one element selected from Ag, Au, Pd, Pt, Rh, Al, Ir, and Ru.

13. A magnetic head comprising the magnetic thin film consisting of an iron carbon film of claim 1 as at least a portion of a magnetic pole material of a recording head.

14. A magnetic head according to claim 13, wherein said recording head is for longitudinal magnetic recording.

15. A magnetic head according to claim 13, wherein said recording head is for perpendicular magnetic recording.

16. A magnetic recording device comprising the magnetic head of claim 13, capable of magnetically recording information on a moving magnetic recording medium using said magnetic head.

17. A magnetic recording device according to claim 16, wherein said magnetic recording medium has an axis of easy magnetization in a direction which is parallel with or perpendicular to a substrate.

18. A magnetic device comprising a hard magnetic film which serves as a recording layer constituting a longitudinal magnetic recording medium, and a magnetic thin film consisting of the iron carbide film of claim 1, which is formed on said hard magnetic film.

19. A magnetic device according to claim 18, wherein an intermediate layer consisting of a non-magnetic film is formed between said magnetic thin film and said hard magnetic film.

20. A magnetic device comprising a hard magnetic film which serves as a recording layer constituting a perpendicular magnetic recording medium, and a magnetic thin film consisting of the iron carbide film of claim 1, which is formed under said hard magnetic film.

21. A magnetic device according to claim 20, wherein an intermediate layer consisting of a non-magnetic film is formed between said magnetic thin film and said hard magnetic film.

22. A magnetic device comprising the magnetic thin film consisting of an iron carbide film of claim 1 used as a soft magnetic layer constituting an exchange-spring magnet.

23. A magnetic device comprising the magnetic thin film consisting of an iron carbide film of claim 1 used as a soft magnetic layer constituting a spin transistor magnet.

24. A magnetic device comprising the magnetic thin film consisting of an iron carbide film of claim 1 used as at least a portion of a transmission line constituting a magnetic sensor.

25. A magnetic device comprising the magnetic thin film consisting of an iron carbide film of claim 1 used as at least a portion of a transmission line constituting a high frequency passive device.

26. A magnetic device comprising the magnetic thin film consisting of an iron carbide film of claim 1 used as at least a portion of a magnetic film constituting a micro transformer or a micro inductor.

27. A magnetic thin film consisting of an iron carbide film, said iron carbide film comprising a martinsite phase as a principal phase and at least carbon and iron as constituent elements, wherein said iron carbide film has a body-centered tetragonal structure and a c-axis constitutes an axis of hard magnetization and a c-plane constitutes a plane of easy magnetization, and wherein said plane of easy magnetization of the magnetic film is a direction horizontal to the film.

28. The magnetic thin film according to claim 1, wherein the film has a saturation magnetic flux density of 1.5 T or greater and a coercive force of 2 Oe or less.

29. The magnetic thin film according to claim 28, wherein the film has a saturation magnetic flux density of 2.0 T or greater and a coercive force of 1 Oe or less.

30. A magnetic thin film consisting of an iron carbide film, said iron carbide film comprising an α' phase as a principal phase and at least carbon and iron as constituent elements, wherein said iron carbide film has a body-centered tetragonal structure and a c-axis constitutes an axis of hard magnetization and a c-plane constitutes a plane of easy magnetization, said axis of hard magnetization constitutes a direction which is perpendicular to the film surface and said plane of easy magnetization constitutes a direction, which is horizontal to the film surface, and wherein said iron carbide film has negative magnetocrystalline anisotropy constants Ku.

31. A magnetic thin film according to claim 30, wherein said iron carbide film consists of not less than 0.5 atomic % and not more than 15 atomic % of carbon and iron as the balance.

32. A magnetic thin film according to claim 30, wherein said iron carbide film consists of not less than 1 atomic % and not more than 12 atomic % of carbon and iron as the balance.

33. A magnetic thin film according to claim 30, wherein said iron carbide film contains cobalt as a third element.

34. A magnetic thin film according to claim 30, wherein said iron carbide film contains nitrogen as a third element.

35. A magnetic thin film according to claim 30, wherein said iron carbide film is formed on a surface of a thin film having an interatomic distance that is within 4 Å±10% of said iron carbide film.

36. A magnetic thin film according to claim 30, wherein the principal element constituting said thin film has lattice constants that are within 4 Å±10% of those of said iron carbide film.

37. A magnetic thin film according to claim 36, which is an iron film having the (200) plane as the surface.

38. A magnetic thin film according to claim 36, wherein the principal element constituting said thin film is at least one element selected from Ag, Au, Pd, Pt, Rh, Al, Ir, and Ru.

* * * * *